United States Patent
Suzuki et al.

(10) Patent No.: US 7,627,178 B2
(45) Date of Patent: Dec. 1, 2009

(54) IMAGE RECOGNITION DEVICE USING FEATURE POINTS, METHOD FOR RECOGNIZING IMAGES USING FEATURE POINTS, AND ROBOT DEVICE WHICH RECOGNIZES IMAGES USING FEATURE POINTS

(75) Inventors: Hirotaka Suzuki, Tokyo (JP); Kohtaro Sabe, Tokyo (JP); Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 10/517,615

(22) PCT Filed: Apr. 22, 2004

(86) PCT No.: PCT/JP2004/005784

§ 371 (c)(1),
(2), (4) Date: Jun. 10, 2005

(87) PCT Pub. No.: WO2004/097742

PCT Pub. Date: Nov. 11, 2004

(65) Prior Publication Data

US 2005/0213818 A1    Sep. 29, 2005

(30) Foreign Application Priority Data

Apr. 28, 2003  (JP) .............................. 2003-124225

(51) Int. Cl.
*G06K 9/46* (2006.01)
(52) U.S. Cl. ...................... 382/190; 382/181; 382/201; 382/209; 382/216; 382/170
(58) Field of Classification Search ................. 382/190, 382/181, 201, 209, 216, 170
See application file for complete search history.

(56) References Cited

U.S. PATENT DOCUMENTS 5,815,591 A * 9/1998 Roehrig et al. .............. 382/130

(Continued)

FOREIGN PATENT DOCUMENTS

JP    2002-8012    1/2002

(Continued)

OTHER PUBLICATIONS

Schmid, et al, "Local Grayvalue Invariants for Image Retrieval", May 1997, IEEE Pattern Analysis and Machine Intelligence, vol. 19, No. 5, pp. 530-535.*

(Continued)

*Primary Examiner*—Edward Park
(74) *Attorney, Agent, or Firm*—Oblon, Spivak, McClelland, Maier & Neustadt, L.L.P.

(57) ABSTRACT

In an image recognition apparatus, feature point extraction sections and extract feature points from a model image and an object image. Feature quantity retention sections extract a feature quantity for each of the feature points and retain them along with positional information of the feature points. A feature quantity comparison section compares the feature quantities with each other to calculate the similarity or the dissimilarity and generates a candidate-associated feature point pair having a high possibility of correspondence. A model attitude estimation section repeats an operation of projecting an affine transformation parameter determined by three pairs randomly selected from the candidate-associated feature point pair group onto a parameter space. The model attitude estimation section assumes each member in a cluster having the largest number of members formed in the parameter space to be an inlier. The model attitude estimation section finds the affine transformation parameter according to the least squares estimation using the inlier and outputs a model attitude determined by this affine transformation parameter.

23 Claims, 14 Drawing Sheets

U.S. PATENT DOCUMENTS 5,832,110 A * 11/1998 Hull .......................... 382/168
6,804,683 B1 * 10/2004 Matsuzaki et al. ....... 707/104.1
7,084,900 B1 * 8/2006 Watanabe et al. ............. 348/94

FOREIGN PATENT DOCUMENTS

JP 2002-175528 6/2002

OTHER PUBLICATIONS

Lowe, David G. "Object Recognition from Local Scale-Invariant Features", Computer Vision, vol. 2, pp. 1150-1157 1999.

U.S. Appl. No. 12/325,493, filed Dec. 1, 2008, Suzuki.

* cited by examiner

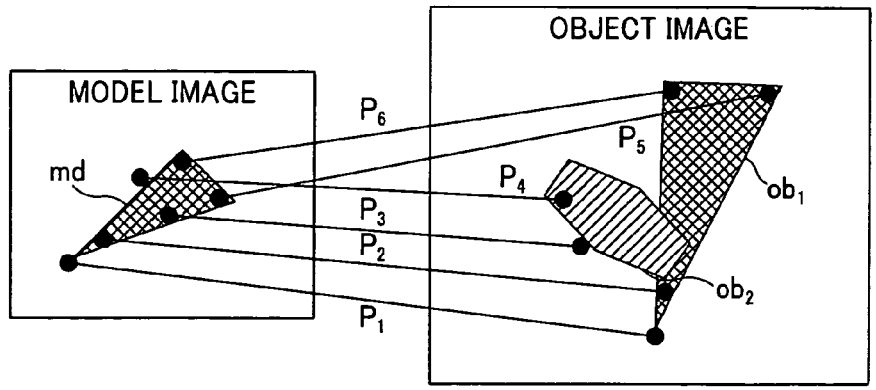
FIG.11A
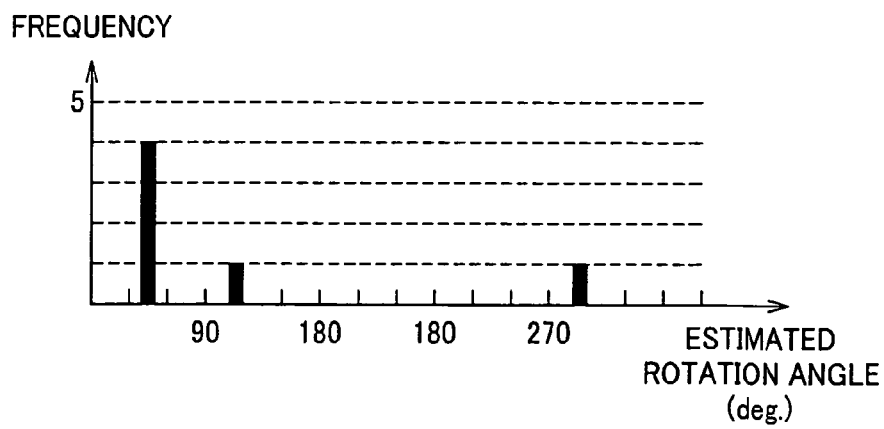
FIG.11B
FIG.11C

IMAGE RECOGNITION DEVICE USING FEATURE POINTS, METHOD FOR RECOGNIZING IMAGES USING FEATURE POINTS, AND ROBOT DEVICE WHICH RECOGNIZES IMAGES USING FEATURE POINTS

The present application claims the right of priority based on Japanese Patent Application No. 2003-124225 which was applied on Apr. 28 in 2003 and is cited for the present application by reference.

TECHNICAL FIELD

The present invention relates to an image recognition apparatus, a method thereof, and a robot apparatus installed with such image recognition function for extracting models to be detected from an object image containing a plurality of objects.

BACKGROUND ART

Presently, many of practically used object recognition technologies use the template matching technique according to the sequential similarity detection algorithm and cross-correlation coefficients. The template matching technique is effective in a special case where it is possible to assume that a detection object appears in an input image. However, the technique is ineffective for an environment to recognize objects from an ordinary image subject to inconsistent viewpoints or illumination states.

Further, there is proposed the shape matching technique that finds a match between a detection object's shape feature and a shape feature of each region in an input image extracted by an image division technique. Under the above-mentioned environment to recognize ordinary objects, the region division yields inconsistent results, making it difficult to provide high-quality representation of object shapes in the input image. The recognition becomes especially difficult when the detection object is partially hidden by another object.

The above-mentioned matching techniques use an overall feature of the input image or its partial region. By contrast, another technique is proposed. The technique extracts characteristic points (feature points) or edges from an input image. The technique uses diagrams and graphs to represent spatial relationship among line segment sets or edge sets comprising extracted feature points or edges. The technique performs matching based on structural similarity between the diagrams or graphs. This technique effectively works for specialized objects. However, a deformed image may prevent stable extraction of the structure between feature points. This makes it especially difficult to recognize an object partially hidden by another object as mentioned above.

Moreover, there are other matching techniques to extract feature points from an image and use a feature quantity acquired from the feature points and image information about local vicinities. For example, C. Schmid and R. Mohr treat corners detected by a Harris corner detector as feature points and propose a technique to use the unrotatable feature quantity near feature points (C. Schmid and R. Mohr, "Local grayvalue invariants for image retrieval", IEEE PAMI, Vol. 19, No 5, pp. 530-534, 1997). This document is hereafter referred to as document 1. The technique uses the constant local feature quantity for partial image deformation at the feature points. Compared to the above-mentioned techniques, this matching technique can perform stable detection even if an image is deformed or a detection object is partially hidden.

However, the feature quantity used in document 1 has no constancy for enlarging or reducing images. It is difficult to recognize images if enlarged or reduced.

On the other hand, D. Lowe proposes the matching technique using feature points and feature quantities unchanged if images are enlarged or reduced (D. Lowe, "Object recognition from local scale-invariant features", Proc. of the International Conference on Computer Vision, Vol. 2, pp. 1150-1157, Sep. 20-25, 1999, Corfu, Greece). This document is hereafter referred to as document 2. The following describes the image recognition apparatus proposed by D. Lowe with reference to FIG. 1.

As shown in FIG. 1, an image recognition apparatus 400 comprises feature point extraction sections 401a and 401b. The feature point extraction sections 401a and 401b acquire images in multiresolution representation from images (model images or object images) targeted to extract feature points. The multi-resolution representation is referred to as scale-space representation (see Lindeberg T., "Scale-space: A framework for handling image structures at multiple scales", Journal of Applied Statistics, Vol. 21, No. 2, pp. 224-270, 1999). The feature point extraction sections 401a and 401b apply a DoG (Difference of Gaussian) filter to the images with different resolutions. Output images from the DoG filter contain locals points (local maximum points and local minimum points). Some of these local points are free from positional changes due to resolution changes within a specified range and are detected as feature points. In this example, the number of resolution levels is predetermined.

Feature quantity retention sections 402a and 402b extract and retain feature quantity of each feature point extracted by the feature point extraction sections 401a and 401b. At this time, the feature point extraction sections 401a and 401b use canonical orientations and orientation planes for feature point neighboring regions. The canonical orientation is a direction to provide a peak value of a direction histogram that accumulates Gauss-weighted gradient strengths. The feature quantity retention sections 402a and 402b retain the canonical orientation as the feature quantity. The feature quantity retention sections 402a and 402b normalize the gradient strength information about the feature point neighboring region. That is to say, directions are corrected by assuming the canonical orientation to be 0 degrees. The gradient strength information about each point in the neighboring region is categorized by gradient directions along with the positional information. For example, let us consider a case of categorizing the gradient strength information about points in the neighboring region into a total of eight orientation planes at 45 degrees each. The gradient information is assumed to have 93 degrees of direction and strength m at points (x, y) on the local coordinate system for the neighboring region. This information is mapped as information with strength m at position (x, y) on an orientation plane that has a 90-degree label and the same local coordinate system as the neighboring region. Thereafter, each orientation plane is blurred and resampled in accordance with the resolution scales. The feature quantity retention sections 402a and 402b retain a feature quantity vector having the dimension equivalent to (the number of resolutions)×(the number of orientation planes)×(size of each orientation plane) as found above.

Then, a feature quantity comparison section 403 uses the k-d tree query (a nearest-neighbor query for feature spaces with excellent retrieval efficiency) to retrieve a model feature point whose feature quantity is most similar to the feature quantity of each object feature point. The feature quantity comparison section 403 retains acquired candidate-associated feature point pairs as a candidate-associated feature point pair group.

On the other hand, a model attitude estimation section 404 uses the generalized Hough transform to estimate attitudes (image transform parameters for rotation angles, enlargement or reduction ratios, and the linear displacement) of a model on the object image according to the spatial relationship between the model feature point and the object feature point. At this time, it is expected to use the above-mentioned canonical orientation of each feature point as an index to a parameter reference table (R table) for the generalized Hough transform. An output from the model attitude estimation section 404 is a voting result on an image transform parameter space. The parameter that scores the maximum vote provides a rough estimation of the model attitude.

A candidate-associated feature point pair selection section 405 selects only candidate-associated feature point pairs whose object feature points as members voted for that parameter to narrow the candidate-associated feature point pair groups.

Finally, a model attitude estimation section 406 uses the least squares estimation to estimate an affine transformation parameter based on the spatial disposition of the corresponding feature point pair group. This operation is based on the restrictive condition that a model to be detected is processed by image deformation to the object image by means of the affine transformation. The model attitude estimation section 406 uses the affine transformation parameter to convert model feature points of the candidate-associated feature point pair group onto the object image. The model attitude estimation section 406 finds a positional displacement (spatial distance) from the corresponding object feature point. The model attitude estimation section 406 excludes pairs having excessive displacements to update the candidate-associated feature point pair group. If there are two candidate-associated feature point pair groups or less, the model attitude estimation section 406 terminates by notifying that a model cannot be detected. Otherwise, the model attitude estimation section 406 repeats this operation until a specified termination condition is satisfied. The model attitude estimation section 406 finally outputs a model recognition result in terms of the model attitude determined by the affine transformation parameter effective when the termination condition is satisfied.

However, there are several problems in the D. Lowe's technique described in document 2.

Firstly, there is a problem about the extraction of the canonical orientation at feature points. As mentioned above, the canonical orientation is determined by the direction to provide the peak value in a direction histogram that accumulates Gauss-weighted gradient strengths found from the local gradient information about feature point neighboring regions. The technique according to document 2 tends to detect feature points slightly inside object's corners. Since two peaks appear in directions orthogonal to each other in a direction histogram near such feature point, there is a possibility of detecting a plurality of competitive canonical orientations. At the later stages, the feature quantity comparison section 403 and the model attitude estimation section 404 are not intended for such case and cannot solve this problem. A direction histogram shape varies with parameters of the Gaussian weight function, preventing stable extraction of the canonical orientation. On the other hand, the canonical orientation is used for the feature quantity comparison section 403 and the model attitude estimation section 404 at later stages. Extracting an improper canonical orientation seriously affects a result of feature quantity matching.

Secondly, the orientation plane is used for feature quantity comparison to find a match between feature quantities according to density gradient strength information at each point in a local region. Generally, however, the gradient strength is not a consistent feature quantity against brightness changes. The stable match is not ensured if there is a brightness difference between the model image and the object image.

Thirdly, a plurality of model feature points having very short, but not shortest, distances in the feature space, i.e., having very similar feature quantities corresponding to each object feature point. The real feature point pair (inlier) may be contained in them. In the feature quantity comparison section 403, however, each object feature point pairs with only a model feature point that provides the shortest distance in the feature space. Accordingly, the above-mentioned inlier is not considered to be a candidate-associated pair.

Fourthly, a problem may occur when the model attitude estimation section 406 estimates affine transformation parameters. False feature point pairs (outliers) are contained in the corresponding feature point pair group narrowed by the candidate-associated feature point pair selection section 405. However, many outliers may be contained in the candidate-associated feature point pair group. There may be an outlier that extremely deviates from the true affine transformation parameters. In such cases, the affine transformation parameter estimation is affected by outliers. Depending on cases, a repetitive operation may gradually exclude the inliers and leave the outliers. An incorrect model attitude may be output.

DISCLOSURE OF THE INVENTION

The present invention has been made in consideration of the foregoing. It is therefore an object of the present invention to provide an image recognition apparatus, a method thereof, and a robot apparatus installed with such image recognition function capable of detecting objects from an image containing a plurality of images partially overlapping with each other and further capable of stably detecting objects despite deformation of the image information due to viewpoint changes (image changes including linear displacement, enlargement and reduction, rotation, and stretch), brightness changes, and noise.

In order to achieve the above-mentioned object, an image recognition apparatus and a method thereof according to the present invention compare an object image containing a plurality of objects with a model image containing a model to be detected and extract the model from the object image. The apparatus and the method comprises: feature point extracting means for (a step of) extracting a feature point from each of the object image and the model image; a feature quantity retention means for (a step of) extracting and retaining, as a feature quantity, a density gradient direction histogram at least acquired from density gradient information in a neighboring region at the feature point in each of the object image and the model image; a feature quantity comparison means for (a step of) comparing each feature point of the object image with each feature point of the model image and generating a candidate-associated feature point pair having similar feature quantities; and a model attitude estimation means for (a step of) detecting the presence or absence of the model on the object image using the candidate-associated feature point pair and estimating a position and an attitude of the model, if any, wherein the feature quantity comparison means (step) itinerantly shifts one of the density gradient direction histograms of feature points to be compared in density gradient direction to find distances between the density gradient direction histograms and generates the candidate-associated feature point pair by assuming a shortest distance to be a distance between the density gradient direction histograms.

When feature quantity matching is performed by assuming, as a feature quantity, a density gradient direction histogram acquired from density gradient information in a neighboring region of feature points, the image recognition apparatus and the method thereof finds a distance between density gradient direction histograms by itinerantly shifting one of the density gradient direction histograms of feature points to be compared in density gradient direction. The shortest distance is assumed to be the distance between the density gradient direction histograms. A candidate-associated feature point pair is generated between feature points having similar distances.

In order to achieve the above-mentioned object, an image recognition apparatus and a method thereof according to the present invention compare an object image containing a plurality of objects with a model image containing a model to be detected and extract the model from the object image, the apparatus and the method comprising: a feature point extracting means for (a step of) extracting a feature point from each of the object image and the model image; a feature quantity retention means for (a step of) extracting and retaining a feature quantity in a neighboring region at the feature point in each of the object image and the model image; a feature quantity comparison means for (a step of) comparing each feature point of the object image with each feature quantity of the model image and generating a candidate-associated feature point pair having similar feature quantities; and a model attitude estimation means for (a step of) detecting the presence or absence of the model on the object image using the candidate-associated feature point pair and estimating a position and an attitude of the model, if any, wherein the model attitude estimation means (step) repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space.

The image recognition apparatus and the method thereof detect the presence or absence of models on an object image using candidate-associated feature point pairs that are generated based on the feature quantity similarity. When a model exists, the image recognition apparatus and the method thereof estimate the model's position and attitude. At this time, the image recognition apparatus and the method thereof repeatedly project an affine transformation parameter determined from three randomly selected candidate-associated feature point pairs onto a parameter space and find an affine transformation parameter to determine a position and an attitude of the model based on an affine transformation parameter belonging to a cluster having the largest number of members out of clusters formed on a parameter space.

A robot apparatus according to the present invention is mounted with the above-mentioned image recognition function.

Other and further objects, features and advantages of the present invention will appear more fully from the following description of a preferred embodiment.

BRIEF DESCRIPTION OF THE DRAWINGS

FIGS. 6A and 6B show a process in a feature quantity retention section of the image recognition apparatus, wherein FIG. 6A shows an example of density gradient information near a feature point within a radius of 3.5 pixels as a neighboring structure from the feature point; and FIG. 6B shows an example of a gradient direction histogram obtained from the density gradient information in FIG. 6A;

FIGS. 11A through 11C show a first technique in the candidate-associated feature point pair selection section of the image recognition apparatus, wherein FIG. 11A exemplifies a candidate-associated feature point pair group; FIG. 11B shows an estimated rotation angle assigned to each candidate-associated feature point pair; and FIG. 11C shows an estimated rotation angle histogram;

BEST MODE FOR CARRYING OUT THE INVENTION

An embodiment of the present invention will be described in further detail with reference to the accompanying drawings. The embodiment is an application of the present invention to an image recognition apparatus that compares an object image as an input image containing a plurality of objects with a model image containing a model to be detected and extracts the model from the object image.

Figure 1:
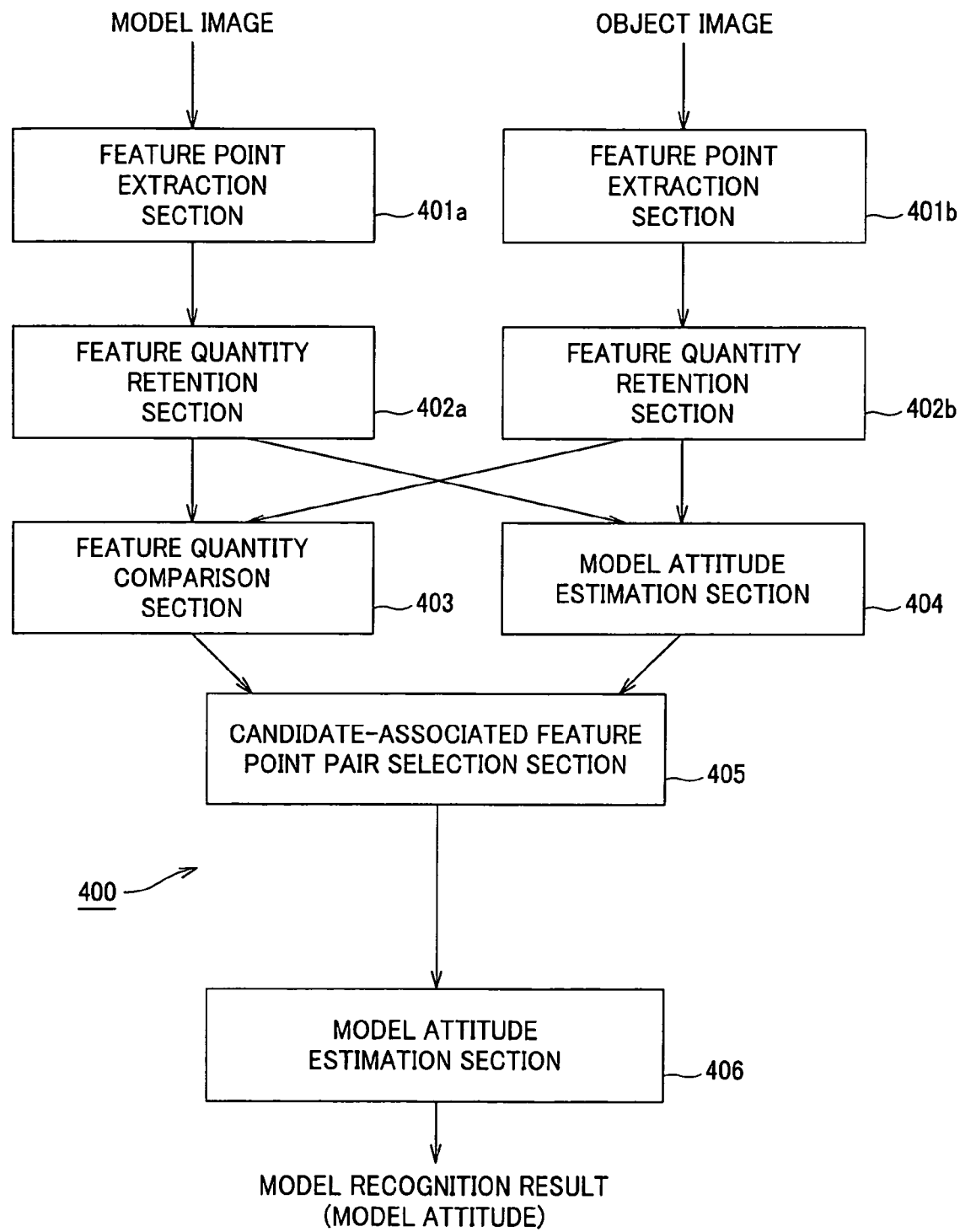
FIG. 1 shows the schematic configuration of a conventional image recognition apparatus.
Figure 2:
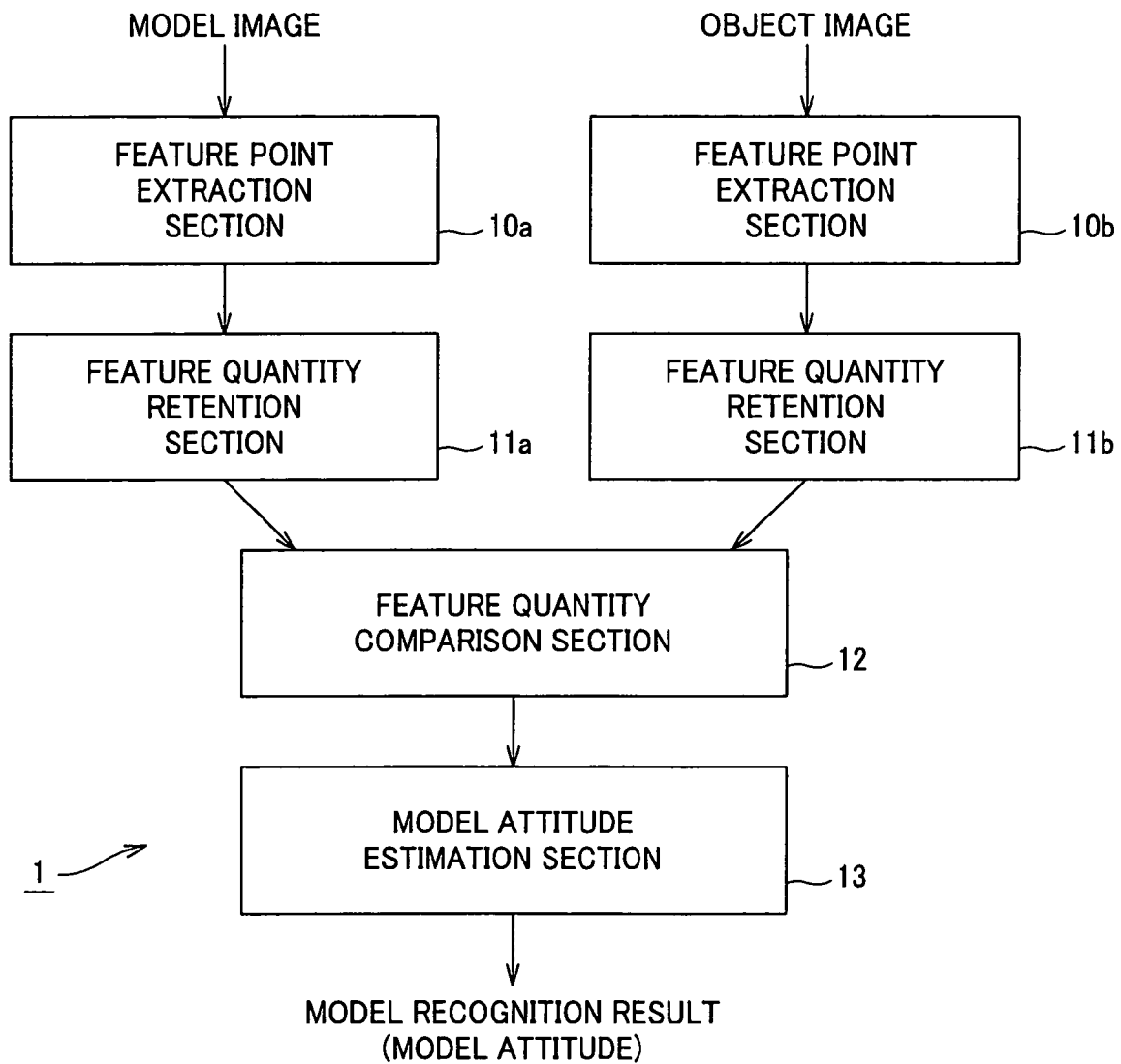
FIG. 2 shows the schematic configuration of an image recognition apparatus according to an embodiment.

FIG. 2 shows the schematic configuration of an image recognition apparatus according to an embodiment. In an image recognition apparatus 1 of FIG. 2, feature point extraction sections 10a and 10b extract model feature points and object feature points from a model image and an object image. Feature quantity retention sections 11a and 11b extract a feature quantity for each of the extracted feature points and retain them along with positional information of the feature points. A feature quantity comparison section 12 compares the feature quantity of each model feature point with that of each object feature point to calculate the similarity or the dissimilarity. Using this similarity criterion, the feature quantity comparison section 12 generates a pair of the model feature point and the object feature point (candidate-associated feature point pair) having similar feature quantities, i.e., having a high possibility of correspondence.

A model attitude estimation section 13 uses a group of the generated candidate-associated feature point pairs to detect the presence or absence of a model on the object image. When the detection result shows that the model is available, the model attitude estimation section 13 repeats an operation of projecting the affine transformation parameter onto a parameter space. The affine transformation parameter is determined by three pairs randomly selected from the candidate-associated feature point pair group based on the restrictive condition that a model to be detected is processed by image deformation to the object image by means of the affine transformation. Clusters formed in the parameter space include a cluster having the largest number of members. The model attitude estimation section 13 assumes each member in such cluster to be a true feature point pair (inlier). The model attitude estimation section 13 finds the affine transformation parameter according to the least squares estimation using this inlier. Since the affine transformation parameter determines a model attitude, the model attitude estimation section 13 outputs the model attitude as a model recognition result.

The following describes in detail each block of the image recognition apparatus 1. The description to follow assumes the horizontal direction of an image to be the X axis and the vertical direction to be the Y axis.

The feature point extraction sections 10a and 10b repeatedly and alternately apply the following operations to an image from which feature points should be extracted: first, smoothing filtering, e.g., convolution (Gaussian filtering) using the 2-dimensional Gaussian function as shown in equation (1) below and then image reduction by means of biquadratic linear interpolation resampling. In this manner, the feature point extraction sections 10a and 10b construct an image's multi-resolution pyramid structure. The resampling factor to be used here is σ used for the Gaussian filter in equation (1).

$$g(x, y) = \frac{1}{2\pi\sigma^2} e^{-(x^2+y^2)/2\sigma^2} \quad (1)$$

Figure 3:
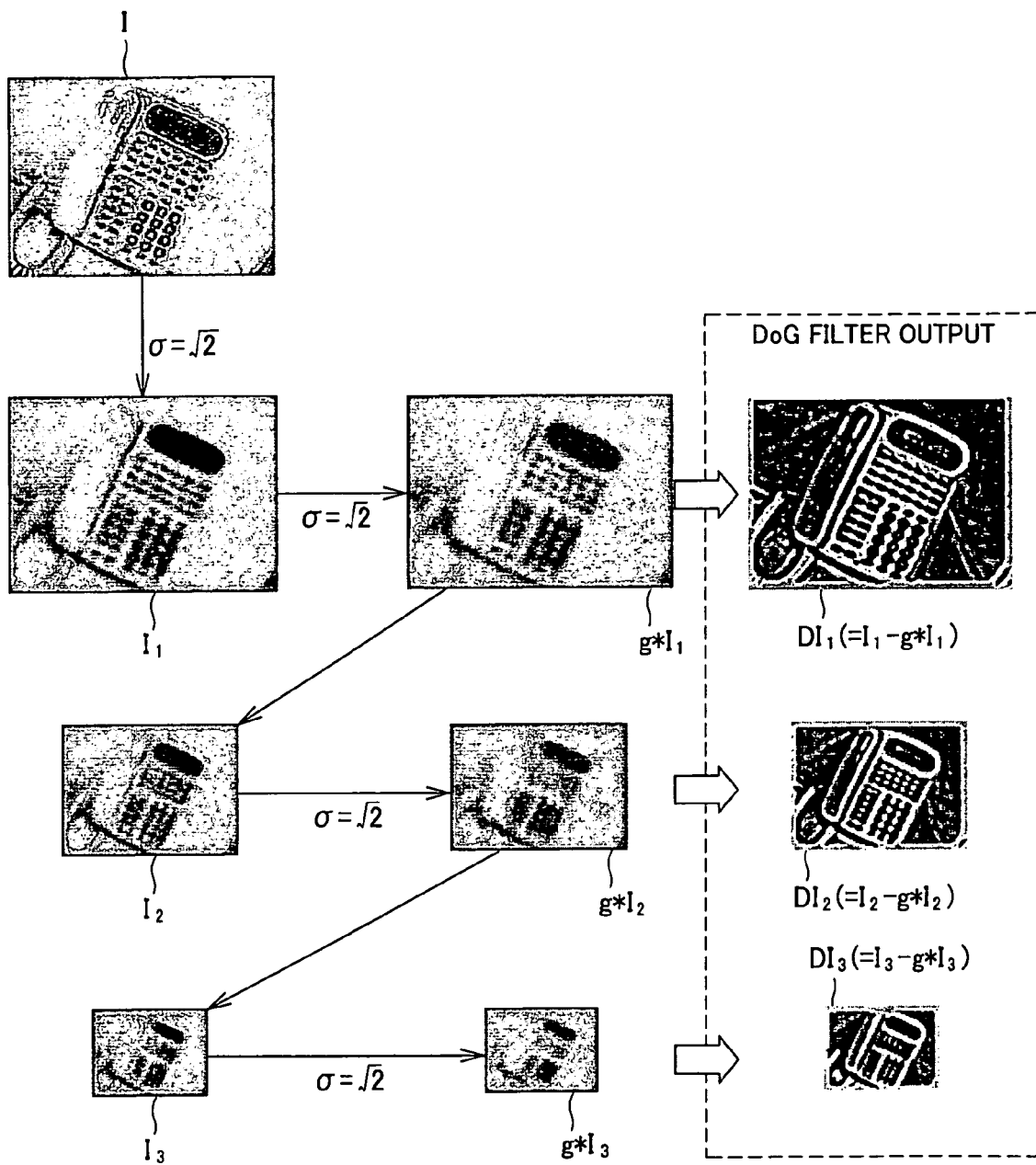
FIG. 3 shows how to construct a multi-resolution pyramid structure of an image in a feature point extraction section of the image recognition apparatus.

As shown in FIG. 3, for example, applying Gaussian filter g(x, y) with σ=√2 to input image I generates first-level (highest resolution) image $I_1$. Further, applying the Gaussian filter generates image $g*I_1$. Resampling the image $g*I_1$ and applying the Gaussian filter to it generates second-level images $I_2$ and $g*I_2$. Likewise, image $g*I_2$ is processed to generate images $I_3$ and $g*I_3$.

The feature point extraction sections 10a and 10b then apply a DoG (Difference of Gaussian) filter to images at respective levels (resolutions). The DoG filter is a type of second-order differential filters used for edge enhancement of images. The DoG filter is often used with the LoG (Laplacian of Gaussian) filter as an approximate model for the process of information from retinas until relayed at the lateral geniculate body in the human visual system. An output from the DoG filter can be easily acquired by finding a difference between two Gaussian filter output images. That is to say, as shown in FIG. 3, image $DI_1(=I_1-g*I_1)$ is obtained for the first-level image. Images $DI_2$ $(=I_2-g*I_2)$ and $DI_3(=I_3-g*I_3)$ are obtained for the second-level and third-level images.

The feature point extraction sections 10a and 10b detect feature points from the local points (local maximum points and local minimum points) in the DoG filter output images $DI_1$, $DI_2$, $DI_3$, and so on at the respective levels. The local points to be detected should be free from positional changes due to resolution changes in a specified range. In this manner, it is possible to realize robust matching between feature points against image enlargement and reduction.

Figure 4:
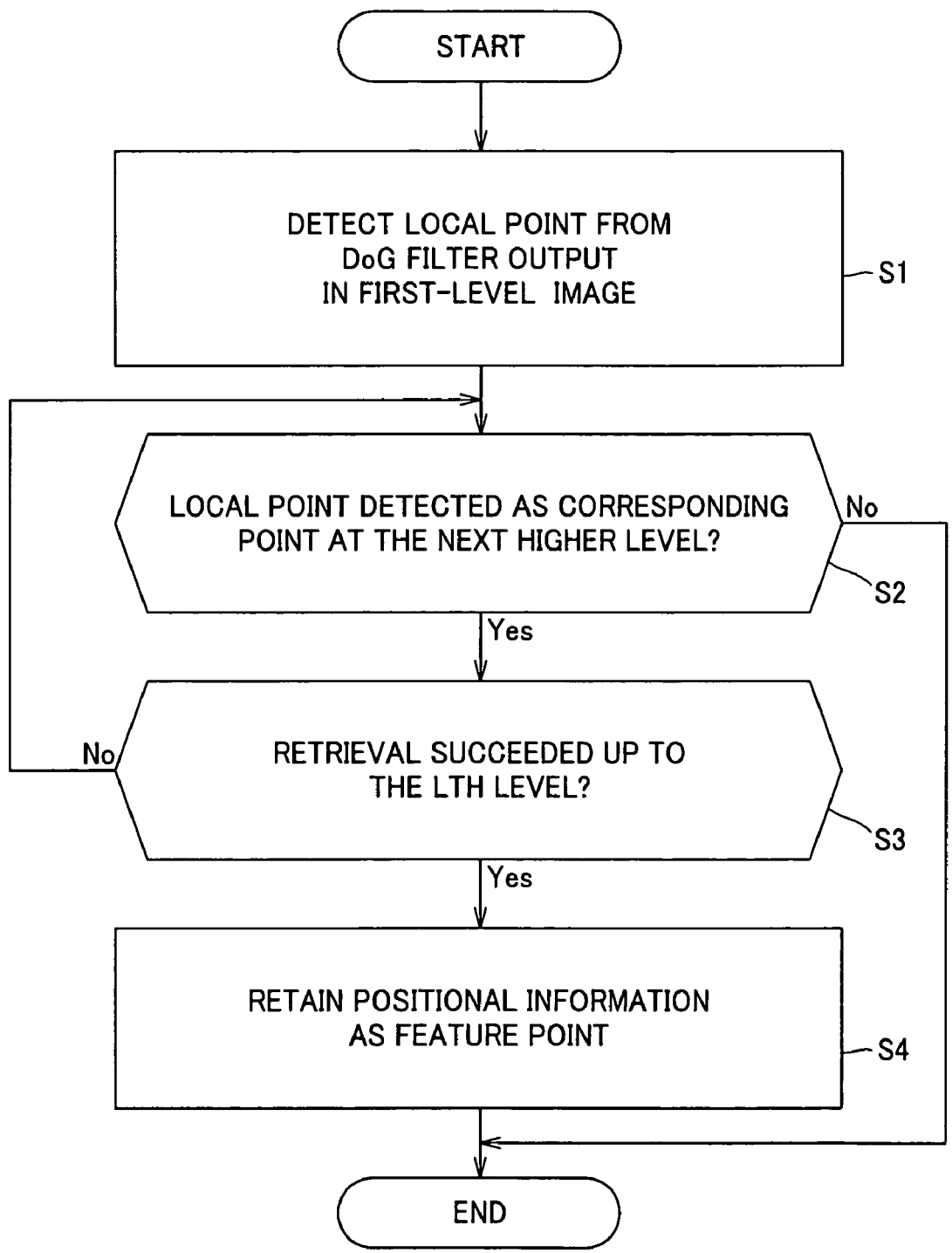
FIG. 4 is a flowchart showing a process of detecting a feature point whose position does not change due to resolution changes up to the Lth level.

With reference to a flowchart in FIG. 4, the following describes a process of detecting a feature point whose position does not change due to resolution changes up to the Lth level of the multi-resolution pyramid structure, i.e., up to the factor σ raised to the (L−1)th power.

At step S1, the process detects local points (local maximum points and local minimum points) in DoG filter output image $DI_1$ at the first level (highest resolution). Available local neighborhoods include the 3×3 direct neighborhood, for example.

At step S2, the process finds a corresponding point for each of the detected local points at the next higher level (a lower layer by one resolution) in consideration for image reduction due to the decreased reduction. The process then determines whether or not the corresponding point is a local point. If the corresponding point is a local point (Yes), the process proceeds to step S3. If the corresponding point is not a local point (No), the retrieval terminates.

At step S3, the process determines whether or not the retrieval succeeds up to the Lth level. If the retrieval does not reach the Lth level (No), the process returns to step S2 and performs the retrieval at a higher level. If the retrieval succeeds up to the Lth level (Yes), the process retains the positional information as the feature point at step S4.

Figure 5:
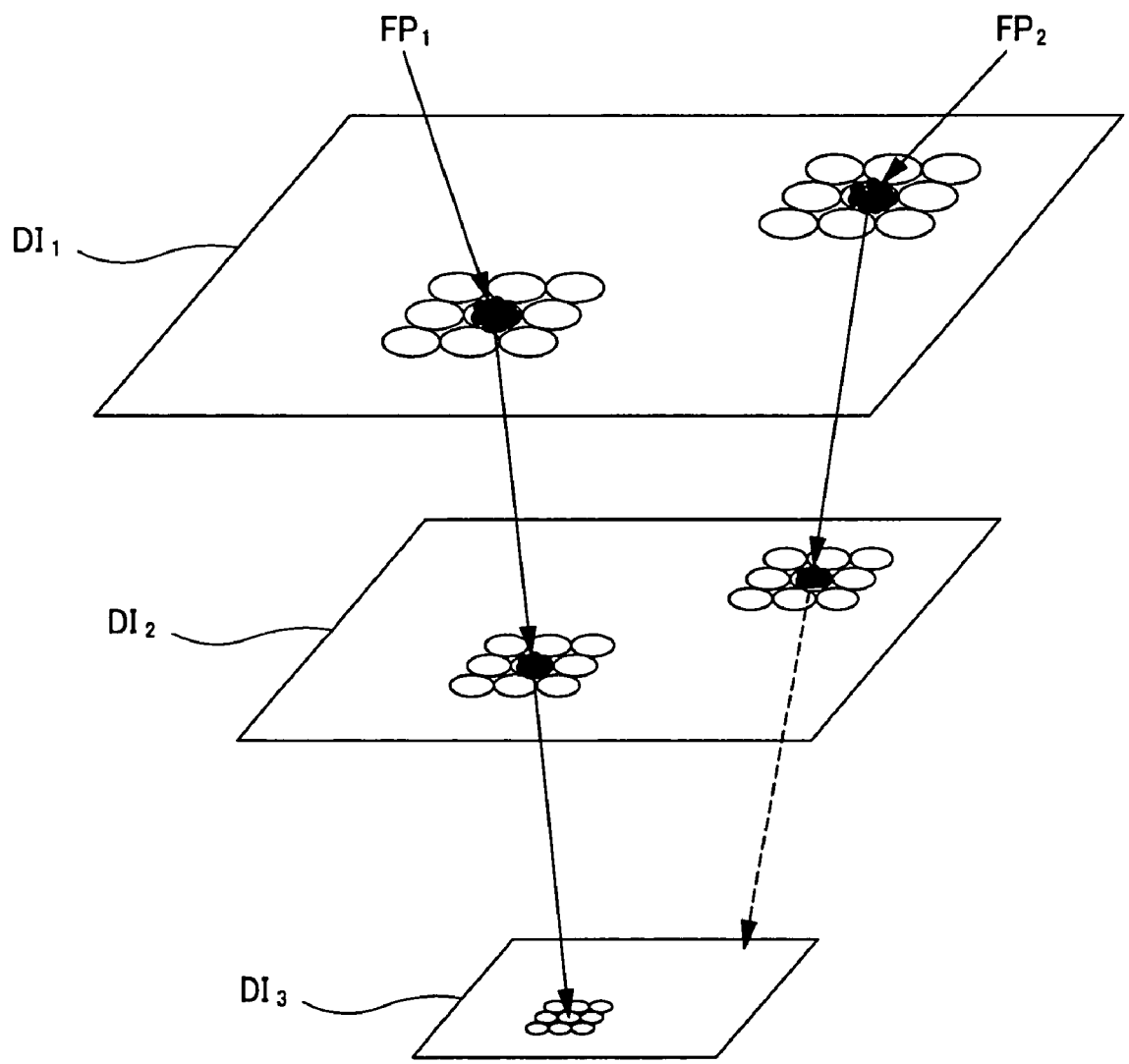
FIG. 5 shows an example of detecting a feature point whose position does not change due to resolution changes up to the third level.

Let us consider a case of detecting a feature point whose position does not change due to a resolution change up to the third level, for example. As shown in FIG. 5, local points $FP_1$ and $FP_2$ are detected in first-level image $DI_1$. $FP_1$ is assumed to be a feature point because the corresponding point is available up to at the third level. $FP_2$ is not assumed to be a feature point because the corresponding point is available only up to at the second level.

The feature point extraction sections 10a and 10b may use the LoG filter instead of the DoG filter. Instead of the DoG filter output, it may be preferable to use output values of the corner-ness function used for the corner detection of objects (Harris C. and Stephens M, "A combined corner and edge detector.", in Proc. Alvey Vision Conf., pp. 147-151, 1988).

The feature quantity retention sections 11a and 11b (FIG. 2) then extract and retain feature quantities for the feature points extracted by the feature point extraction sections 10a and 10b. The feature quantity to be used is density gradient information (gradient strength and gradient direction) at each point in a neighboring region for the feature points derived from the image information about image ($I_1$ where l=1, ..., L) at each level in the multi-resolution pyramid structure. The following equations (2) and (3) provide gradient strength $M_{x,y}$ and gradient direction $R_{x,y}$ at point (x, y).

$$M_{x,y} = \sqrt{(I_{x+1,y}-I_{x,y})^2 + (I_{x,y+1}-I_{x,y})^2} \quad (2)$$

$$R_{x,y} = \tan^{-1}(I_{x,y+1}-I_{x,y}, I_{x+1,y}-I_{x,y}) \quad (3)$$

For the purpose of calculating feature quantities in this example, it is preferable to select a feature point neighboring region that maintains its structure unchanged against rotational changes and is symmetric with respect to a feature point. This makes it possible to provide robustness against rotational changes. For example, it is possible to use (i) the technique to determine the feature point neighboring region within a radius of r pixels from the feature point and (ii) the technique to multiply the density gradient by a 2-dimensional Gaussian weight symmetric with respect to the feature point having a width of σ.

Figure 6B:
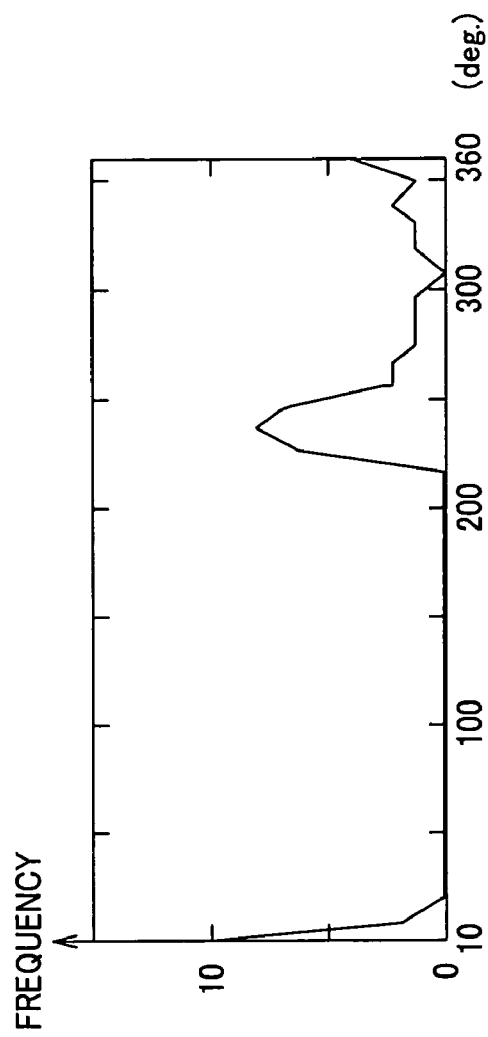
Figure 6A:
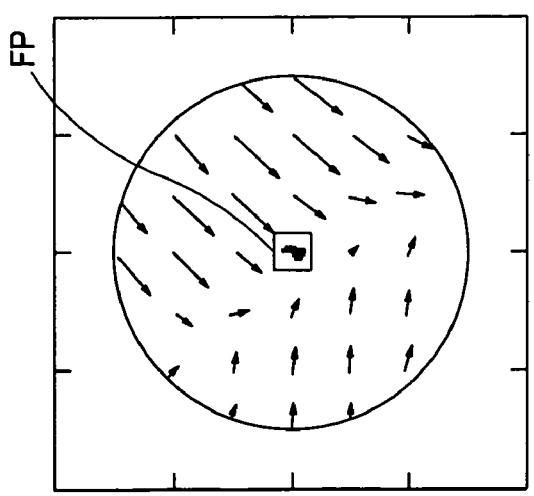

FIG. 6A shows an example of density gradient information in a feature point neighboring region when the neighboring region is assumed within a radius of 3.5 pixels from feature point FP. In FIG. 6A, an arrow length represents a gradient strength. An arrow direction represents a gradient direction.

The feature quantity retention sections 11a and 11b also retain a histogram (direction histogram) concerning gradient directions near feature points as a feature quantity. FIG. 6B shows an example of a gradient direction histogram obtained from the density gradient information in FIG. 6A. In FIG. 6B, class width Δθ is 10 degrees, and the number of classes N is 36 (=360 degrees divided by 10 degrees).

The feature quantity comparison section 12 (FIG. 2) then compares the feature quantity of each model feature point with the feature quantity of each object feature point. The feature quantity comparison section 12 generates pairs (candidate-associated feature point pairs) of model feature points and object feature points having similar feature quantities.

Figure 7:
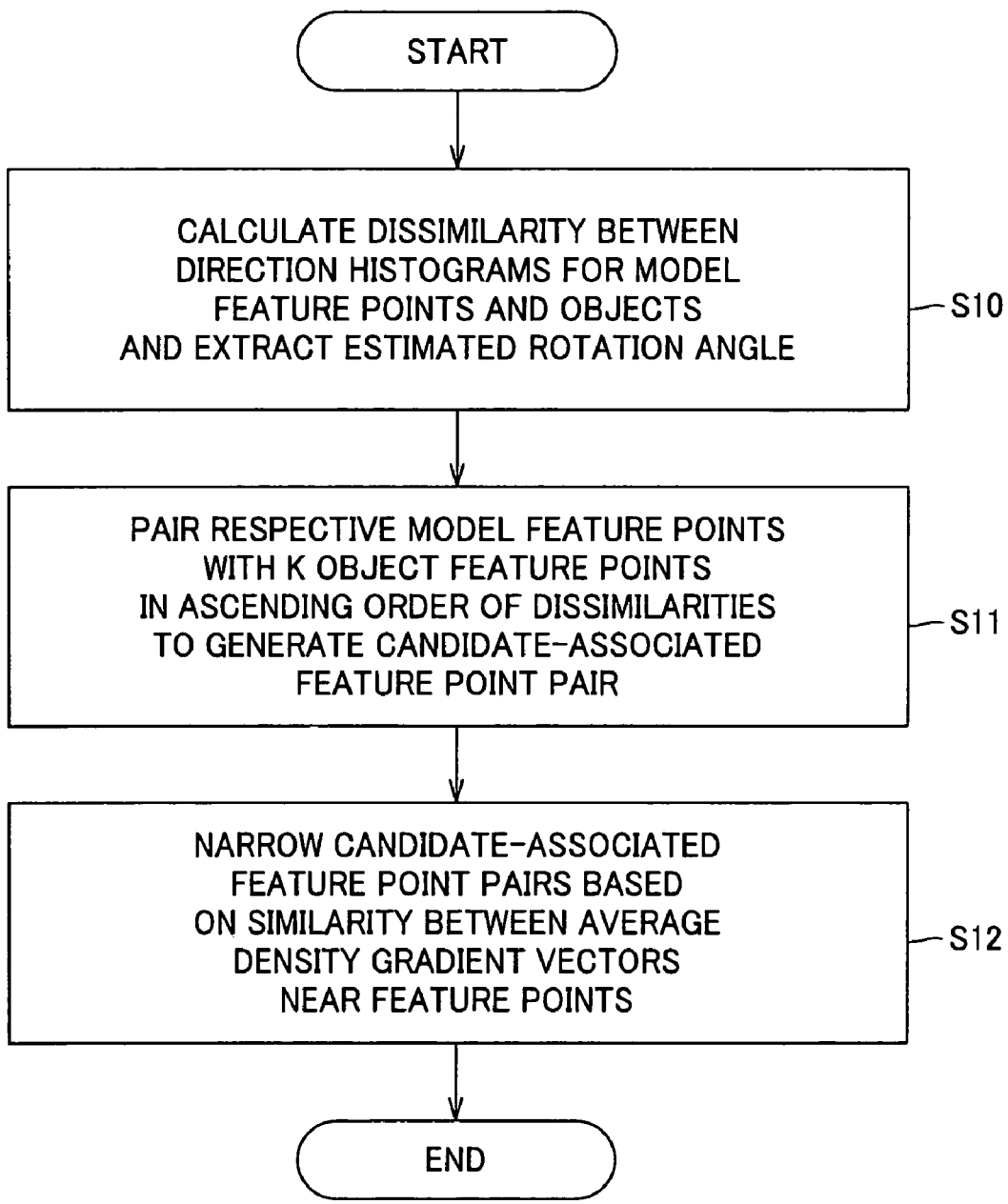
FIG. 7 is a flowchart showing in detail a process of the feature quantity comparison section in the image recognition apparatus.

With reference to the flowchart in FIG. 7, a process in the feature quantity comparison section 12 will be described in detail. At step S10, the feature quantity comparison section 12 compares a direction histogram of each model feature point and the direction histogram of each object feature point to calculate a distance (dissimilarity) between the histograms. In addition, the feature quantity comparison section 12 finds an estimated rotation angle between the model and the object.

Now, let us suppose that there are two direction histograms, having same class width Δθ and same number of classes N, $H_1=\{h_1(n), n=1, \ldots, N\}$ and $H_2=\{h_2(n), n=1, \ldots, N\}$ and that $h_1(n)$ and $h_2(n)$ represent frequencies at class n. For example, equation (4) to follow provides distance d $(H_1, H_2)$ between histograms $H_1$ and $H_2$. In equation (4), r can be generally substituted by 1, 2, and ∞.

$$d(H_1, H_2) = \left(\sum_i \|h_1(i) - h_2(i)\|^r\right)^{1/r} \quad (4)$$

Equation (4) is used to calculate a dissimilarity between the direction histograms for each model feature point and each object feature point. (i) A scale ratio is unknown between the model and the object at the matching level. Therefore, the matching needs to be performed between the direction histograms at the respective levels of model feature points and the respective levels of object feature points. (ii) A rotation conversion amount between the model and the object needs to be considered concerning the matching between the direction histograms.

Let us consider a case of finding a dissimilarity between direction histogram $H_m^{LV}=\{h_m^{LV}(n), n=1, \ldots, N\}$ at level LV for model feature point m and direction histogram $H_o^{lv}=\{h_o^{lv}(n), n=1, \ldots, N\}$ at level lv for object feature point o. The direction histogram itinerantly varies with the rotation conversion. Accordingly, equation (4) is calculated by itinerantly shifting the classes one by one for $H_o^{lv}$. The minimum value is assumed to be the dissimilarity between $H_m^{LV}$ and $H_o^{lv}$. At this time, it is possible to assume a rotation angle of the object feature point according to the shift amount (the number of shifted classes) when the minimum dissimilarity is given. This technique is known as the direction histogram crossing method.

Let us assume that $H_o^{lv}$ is shifted for k classes to yield direction histogram $H_o^{lv(k)}$. In this case, equation (5) to follow gives dissimilarity $(H_m^{LV}, H_o^{lv(k)})$ between the direction histograms according to the direction histogram crossing method.

$$\text{dissimilarity}(H_m^{LV}, H_o^{lv}) = \min_{k=0}^{N-1}(d(H_m^{LV}, H_o^{lv(k)})) \quad (5)$$

Let us assume that k' is a substitute for k to give minimum d $(H_m^{LV}, H_o^{lv(k)})$. Then, equation (6) to follow gives estimated rotation angle θ (m, LV, o, lv) in a neighboring region at object feature point o.

$$\theta(m,LV,o,lv)=k'\Delta\theta \quad (6)$$

In consideration for (i) above, equation (7) to follow formulates dissimilarity (Hm, Ho) between the direction histograms at model feature point m and object feature point o.

$$\text{dissimilarity}(H_m,H_o)=\min_{LV,lv}(\text{dissimilarity}(H_m^{LV}, H_o^{lv})) \quad (7)$$

Correspondingly to each pair (m, n) of model feature point m and object feature point o, the feature quantity comparison section 12 retains levels LV and lv (hereafter represented as $LV_m^*$ and $lv_o^*$, respectively) to provide the minimum dissimilarity (Hm, Ho) between the direction histograms and the corresponding estimated rotation angle θ (m, $LV_m^*$, o, $lv_o^*$) as well as dissimilarity (Hm,Ho) between the direction histograms.

Then, at step S11 (FIG. 7), the feature quantity comparison section 12 selects K object feature points $o_{m1}, \ldots,$ and $o_{mK}$ for each model feature point m in ascending order of dissimilarities between the direction histograms to make a candidate-associated feature point pair. That is to say, there are made K candidate-associated feature point pairs (m, $o_{m1}$), . . . , (m, $o_{mk}$), . . . , (m, $o_{mK}$) for each model feature point m. Further, each candidate-associated feature point pair (m, $o_{mk}$) retains information about the corresponding levels $LV_m^*$ and $lv_{omk}^*$, and estimated rotation angle θ (m, $LV_m^*$, o, $lv_{omk}^*$).

In this manner, candidate-associated feature point pairs are made for all model feature points. The obtained pair group becomes the candidate-associated feature point pair group.

As mentioned above, the feature quantity comparison section 12 pays attention only to the gradient direction, not accumulating gradient strengths for the histogram frequency. The robust feature quantity matching is available against brightness changes. The technique in the above-mentioned document 2 performs matching based on the feature quantity such as the canonical orientation whose extraction is unstable. By contrast, the embodiment of the present invention can perform more stable matching in consideration for direction histogram shapes. In addition, it is possible to obtain the stable feature quantity (estimated rotation angle).

While there has been described that K candidate-associated feature point pairs are selected for each model feature point m at step S11 above, the present invention is not limited thereto. It may be preferable to select all pairs for which the dissimilarity between the direction histograms falls short of a threshold value.

The candidate-associated feature point pair group generated by the above-mentioned operations also contains a corresponding point pair that has similar direction histograms but has different spatial features of the density gradients. At step S12 (FIG. 7), the process selects a pair based on the similarity between density gradient vectors and updates the candidate-associated feature point pair group.

Specifically, density gradient vector $U_m$ is assumed at level $LV_m^*$ near model feature point m. Density gradient vector $U_o$ is assumed at level $lv_{omk}*$ near object feature point o to make a corresponding point pair with model feature point m. Under this condition, the process excludes pairs whose similarity between $U_m$ and $U_o$ is below the threshold value to update the candidate-associated feature point pair group.

Figure 8:
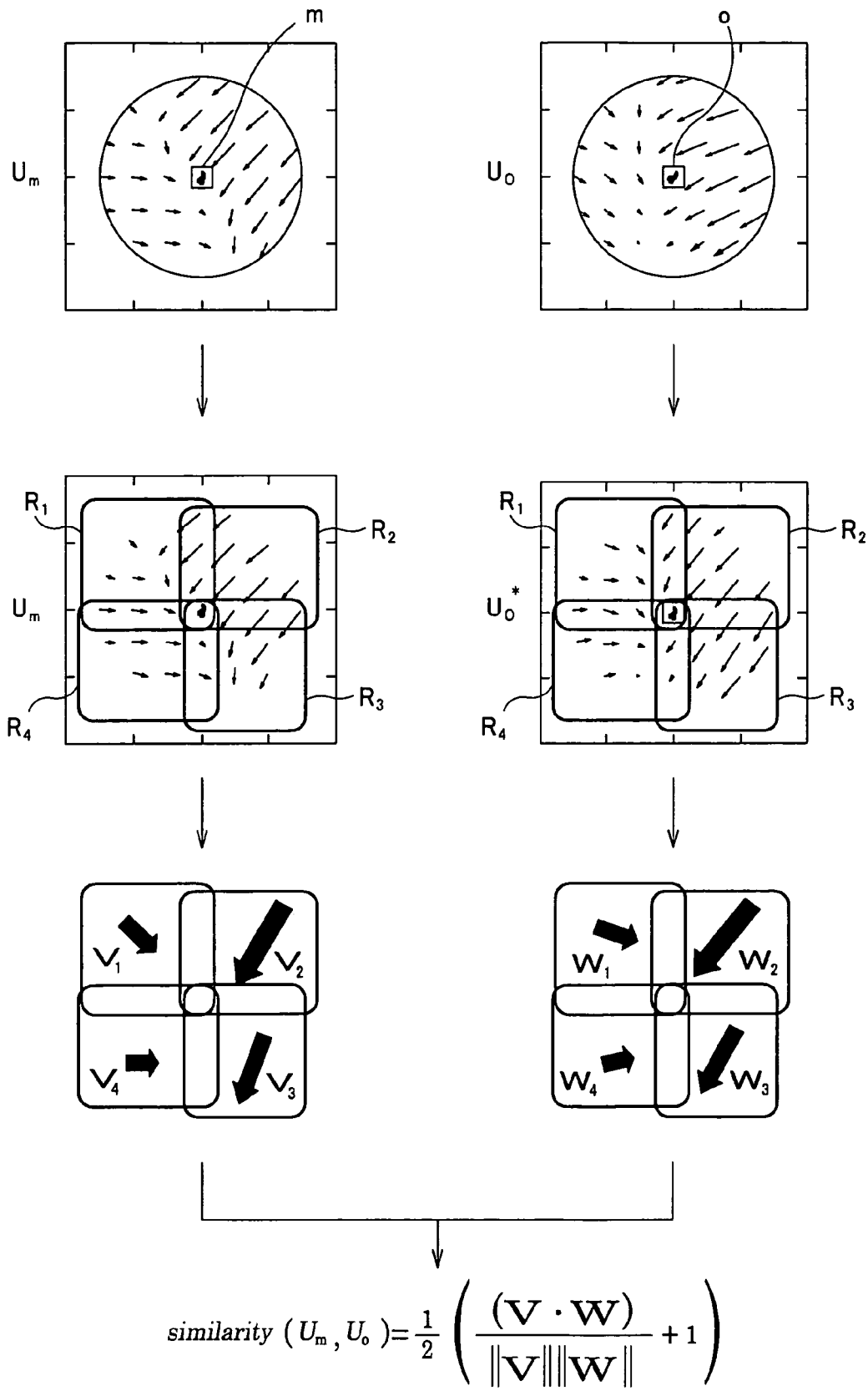
FIG. 8 shows a technique of calculating similarity between density gradient vectors $U_m$ and $U_o$.

FIG. 8 shows a technique of calculating similarity between density gradient vectors $U_m$ and $U_o$. First, $U_m$ is spatially divided into four regions $R_i$(i=1 through 4) to find average density gradient vector $V_i$(i=1 through 4) for each region. $U_m$ is represented by 8-dimensional vector V composed of $V_i$. For matching of the density gradient information in consideration for the rotation conversion, the gradient direction of $U_o$ is corrected by the already found estimated rotation angle θ (m, $LV_m*$, O, $lv_{omk}*$) to obtain $U_o*$. At this time, the biquadratic linear interpolation is used to find values at intermediate positions. Likewise, $U_o*$ is divided into four regions $R_i$(i=1 through 4) to find average density gradient vector $W_i$(i=1 through 4) for each region. $U_o$ is represented by 8-dimensional vector W composed of $W_i$. At this time, similarity ($U_m$, $U_o$)∈[0,1] between $U_m$ and $U_o$ is interpreted as the similarity between average density gradient vectors V and W. For example, the similarity is found by equation (8) to follow using a cosine correlation value. In equation (8), (V·W) represents an inner product between V and W.

$$\text{similarity}(U_m, U_o) = \frac{1}{2}\left(\frac{(V \cdot W)}{\|V\|\|W\|} + 1\right) \quad (8)$$

The feature quantity comparison section 12 finds the similarity between average density gradient vectors found in equation (8) for each candidate-associated feature point pair. The feature quantity comparison section 12 excludes a pair whose similarity falls short of threshold value δ to update the candidate-associated feature point pair group.

In this manner, the feature quantity comparison section 12 uses the average density gradient vectors in partial regions to compare feature quantities. Accordingly, it is possible to provide the robust matching against slight differences in feature point positions or estimated rotation angles and against changes in the density gradient information due to brightness changes. Further, the calculation amount can be also reduced.

The above-mentioned operations can extract a group of pairs (model feature points and object feature points) having the local density gradient information similar to each other near the feature points. Macroscopically, however, the obtained pair group contains a "false feature point pair (outlier)" in which the spatial positional relationship between corresponding feature points contradicts the model's attitude (model attitude) on the object image.

If there are three candidate-associated feature point pairs or more, the least squares estimation can be used to estimate an approximate affine transformation parameter. The model attitude can be recognized by repeating the operation of excluding a corresponding pair having a contradiction between the estimated model attitude and the spatial positional relationship and reexecuting the model attitude estimation using the remaining pairs.

However, the candidate-associated feature point pair group may contain many outliers. There may be an outlier that extremely deviates from the true affine transformation parameters. In these cases, it is known that the least squares estimation generally produces unsatisfactory estimation results (Hartley R., Zisserman A., "Multiple View Geometry in Computer Vision", Chapter 3, pp. 69-116, Cambridge University Press, 2000). The model attitude estimation section 13 (FIG. 2) according to the embodiment, under the restriction of the affine transformation, extracts a "true feature point pair (inlier)" from the spatial positional relationship in the candidate-associated feature point pair group. Using the extracted inlier, the model attitude estimation section 13 estimates model attitudes (affine transformation parameters to determine the linear displacement, rotation, enlargement and reduction, and stretch).

The following describes a process in the model attitude estimation section 13. As mentioned above, the affine transformation parameters cannot be determined unless there are three candidate-associated feature point pairs or more. If there are two candidate-associated feature point pairs or less, the model attitude estimation section 13 outputs a result of being unrecognizable and terminates the process assuming that no model is contained in the object image or the model attitude detection fails. If there are three candidate-associated feature point pairs or more, the model attitude estimation section 13 estimates the affine transformation parameters, assuming that the model attitude can be detected. It should be noted that the model attitude estimation section 13 estimates the model attitude based on spatial positions of the feature points, for example, at the first level (highest resolution) of the model image and the object image.

Equation (9) to follow gives the affine transformation from model feature point $[x\ y]^T$ to object feature point $[u\ v]^T$.

$$\begin{bmatrix} u \\ v \end{bmatrix} = \begin{bmatrix} a_1 & a_2 \\ a_3 & a_4 \end{bmatrix}\begin{bmatrix} x \\ y \end{bmatrix} + \begin{bmatrix} b_1 \\ b_2 \end{bmatrix} \quad (9)$$

In equation (9), $a_i$(i=1 through 4) represents parameters to determine rotation, enlargement, reduction, and stretch; $[b_1\ b_2]^T$ represents a linear displacement parameter. It is necessary to determine six affine transformation parameters $a_1$ through $a_4$, $b_1$, and $b_2$. The affine transformation parameters can be determined if there are three candidate-associated feature point pairs.

Let us assume that pair group P comprises three candidate-associated feature point pairs such as $([x_1\ y_1]^T, [u_1\ v_1]^T)$, $([x_2\ y_2]^T, [u_2\ v_2]^T)$, and $([x_3\ y_3]^T, [u_3\ v_3]^T)$. Then, the relationship between pair group P and the affine transformation parameters can be represented in a linear system formulated in equation (10) below.

$$\begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix}\begin{bmatrix} a_1 \\ a_2 \\ a_3 \\ a_4 \\ b_1 \\ b_2 \end{bmatrix} = \begin{bmatrix} u_1 \\ v_1 \\ u_2 \\ v_2 \\ u_3 \\ v_3 \end{bmatrix} \quad (10)$$

When equation (10) is transcribed into Ax=b, equation (11) to follow gives the least squares solution for affine transformation parameter x.

$$x = A^{-1}b \quad (11)$$

When pair group P is repeatedly and randomly selected so that one or more outliers are mixed from the candidate-associated feature point pair group, the affine transformation parameters are dispersedly projected onto the parameter space. On the other hand, when pair group P comprising only inliers is selected repeatedly and randomly, the affine transformation parameters unexceptionally become very similar to the true affine transformation parameters for the model attitude, i.e., being near to each other on the parameter space. Therefore, pair group P is randomly selected from the candidate-associated feature point pair group to project the affine transformation parameters onto the parameter space. When this operation is repeated, inliers constitute a highly dense cluster (having many members) on the parameter space. Outliers appear dispersedly. Base on this, clustering is performed on the parameter space to determine inliers in terms of elements of a cluster that has the largest number of members.

A process in the model attitude estimation section 13 will be described in detail with reference to the flowchart in FIG. 9. It is assumed that the NN (Nearest Neighbor) method is used as a clustering technique for the model attitude estimation section 13. Since the $b_1$ and $b_2$ described above can take various values depending on images to be recognized, clustering on the x space also depends on images to be recognized with respect to selection of a clustering threshold value. To solve this, the model attitude estimation section 13 performs clustering only on the parameter space composed of parameters $a_1$ through $a_4$ (hereafter represented as a) on the assumption that there hardly exists pair group P to provide the affine transformation parameters $a_1$ through $a_4$ being similar to but $b_1$ and $b_2$ being different from the true parameters. In the event of a situation where the above-mentioned assumption is not satisfied, clustering is performed on the parameter space composed of $b_1$ and $b_2$ independently of the a space. In consideration for the result, it is possible to easily avoid the problem.

Figure 9:
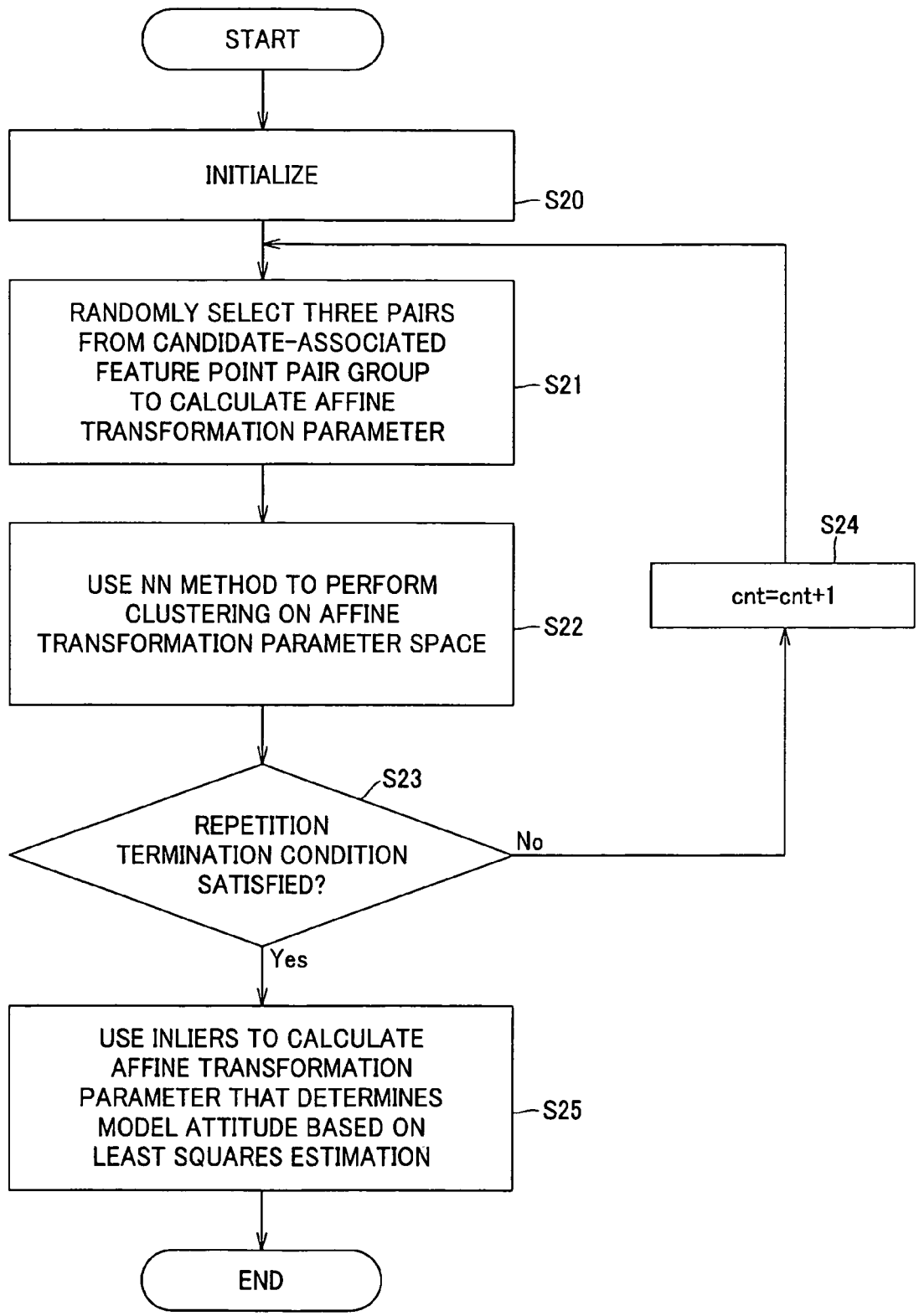
FIG. 9 is a flowchart showing in detail a process of a model attitude estimation section in the image recognition apparatus.

At step S20 in FIG. 9, the process is initialized. Specifically, the process sets count value cnt to 1 for the number of repetitions. The process randomly selects pair group $P_1$ from the candidate-associated feature point pair group to find affine transformation parameter $a_1$. Further, the process sets the number of clusters N to 1 to create cluster $C_i$ around $a_1$ on affine transformation parameter space a. The process sets centroid $c_1$ for cluster $c_1$ to $a_1$, sets the number of members $nc_i$ to 1, and updates count value cnt to 2.

At step S21, the model attitude estimation section 13 randomly selects pair group $P_{cnt}$ from the candidate-associated feature point pair group to find affine transformation parameter $a_{cnt}$.

At step S22, the model attitude estimation section 13 uses the NN method to perform clustering on the affine transformation parameter space. Specifically, the model attitude estimation section 13 finds minimum distance $d_{min}$ out of distance $d(a_{cnt}, c_i)$ between affine transformation parameter $a_{cnt}$ and centroid $c_i$ (i=1 through N) of each cluster $C_i$ according to equation (12) below.

$$d_{min} = \min_{1 \le i \le N} \{d(a_{cnt}, c_i)\} \quad (12)$$

Under the condition of $d_{min} < \tau$, where $\tau$ is a specified threshold value and is set to 0.1, for example, $a_{cnt}$ is allowed to belong to cluster $C_i$ that provides $d_{min}$. Centroid $c_i$ for cluster $C_i$ is updated in all members including $a_{cnt}$. Further, the number of members $nc_i$ for cluster $C_i$ is set to $nc_i+1$. On the other hand, under the condition of $d_{min} \ge \tau$, new cluster $C_{N+1}$ is created on affine transformation parameter space a with $a_{cnt}$ being set to centroid $c_{N+1}$. The number of members $nc_{N+1}$ is set to 1. The number of clusters N is set to N+1.

At step S23, it is determined whether or not a repetition termination condition is satisfied. For example, the repetition termination condition can be configured as follows. The process should terminate when the maximum number of members exceeds a specified threshold value (e.g., 15) and a difference between the maximum number of members and the second maximum number of members exceeds a specified threshold value (e.g., 3); or when count value cnt for a repetition counter exceeds a specified threshold value (e.g., 5000 times). If the repetition termination condition is not satisfied (No) at step S23, the process sets count value cnt for repetitions to cnt+1 at step S24, and then returns to step S21. On the other hand, if the repetition termination condition is satisfied (Yes), the process proceeds to step S25.

Finally, at step S25, the model attitude estimation section 13 uses the inliers acquired above to estimate an affine transformation parameter that determines the model attitude based on the least squares method.

Let us assume the inliers to be $([X_{IN1}\ y_{IN1}]^T, [u_{IN1}\ v_{IN1}]^T)$, $([x_{IN2}\ y_{In2}]^T, [u_{IN2}\ v_{IN2}]^T)$, and so on. Then, the relationship between the inliers and the affine transformation parameters can be represented in a linear system formulated in equation (13) below.

$$\begin{bmatrix} x_{IN1} & y_{IN1} & 0 & 0 & 1 & 0 \\ 0 & 0 & x_{IN1} & y_{IN1} & 0 & 1 \\ x_{IN2} & y_{IN2} & 0 & 0 & 1 & 0 \\ 0 & 0 & x_{IN2} & y_{IN2} & 0 & 1 \\ & & \cdots & & & \\ & & \cdots & & & \end{bmatrix} \begin{bmatrix} a_1 \\ a_2 \\ a_3 \\ a_4 \\ b_1 \\ b_2 \end{bmatrix} = \begin{bmatrix} u_{IN1} \\ v_{IN1} \\ u_{IN2} \\ v_{IN2} \\ \vdots \\ \vdots \end{bmatrix} \quad (13)$$

When equation (13) is transcribed into $A_{IN}x_{IN}=b_{IN}$, equation (14) to follow gives the least squares solution for affine transformation parameter $x_{IN}$.

$$x_{IN} = (A_{IN}^T A_{IN})^{-1} A_{IN}^T b_{IN} \quad (14)$$

At step S25, the process outputs a model recognition result in terms of the model attitude determined by affine transformation parameter $x_{IN}$.

While the above-mentioned description assumes threshold value $\tau$ to be a constant value, the so-called "simulated annealing method" may be used. That is to say, relatively large values are used for threshold value $\tau$ to roughly extract inliers at initial stages of the repetitive process from steps S21 through S24. As the number of repetitions increases, values for threshold value $\tau$ are decreased gradually. In this manner, it is possible to accurately extract inliers.

According to the above-mentioned description, the process repeats the operation of randomly selecting pair group P from the candidate-associated feature point pair group and projecting the affine transformation parameters onto the parameter space. The process determines inliers in terms of elements of a cluster that has the largest number of members. The least squares method is used to estimate affine transformation parameters to determine the model attitude. However, the present invention is not limited thereto. For example, it may be preferable to assume the centroid of a cluster having the largest number of members to be an affine transformation parameter to determine the model attitude.

Figure 10:
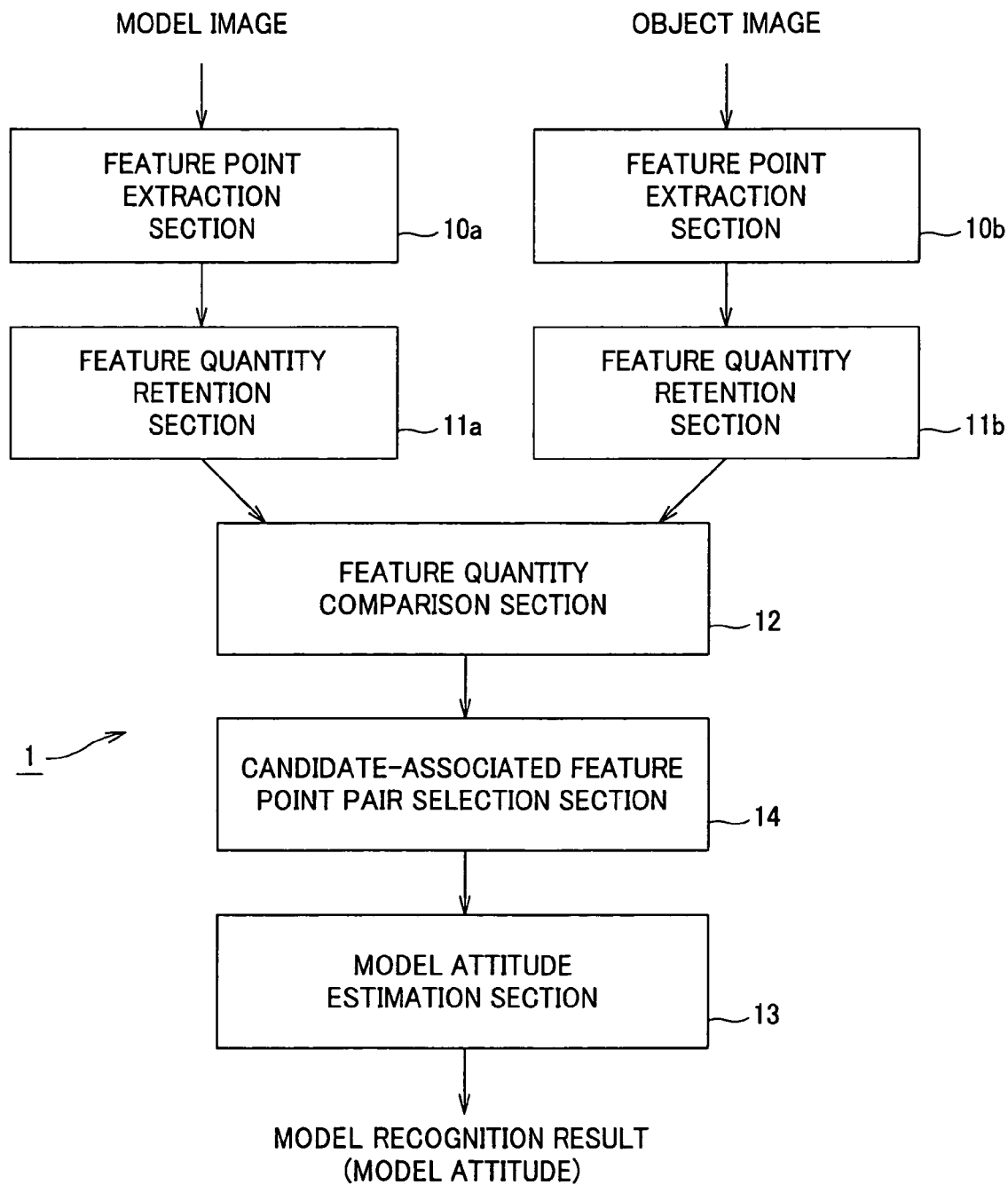
FIG. 10 shows the schematic configuration of an image recognition apparatus having a candidate-associated feature point pair selection section.

Outliers are contained in the candidate-associated feature point pair group generated in the feature quantity comparison section 12. Increasing the ratio of those outliers decreases probability of the model attitude estimation section 13 to select inliers. Estimation of the model attitude requires many repetitions, thus increasing the calculation time. Therefore, it is desirable to exclude as many outliers as possible from the candidate-associated feature point pair group supplied to the model attitude estimation section 13. For this purpose, as shown in FIG. 10, the image recognition apparatus 1 according to the embodiment can allow a candidate-associated feature point pair selection section 14 (to be described) between the feature quantity comparison section 12 and the model attitude estimation section 13.

As a first technique, the candidate-associated feature point pair selection section 14 creates an estimated rotation angle histogram to select candidate-associated feature point pairs. The following description assumes a model image containing model md and an object image containing objects $ob_1$ and $Ob_2$ as shown in FIG. 11A. The feature quantity comparison section 12 generates candidate-associated feature point pair groups $P_1$ through $P_6$ between model feature point m and object feature point o as shown in FIG. 11A. Of these, it is assumed that $P_1$, $P_2$, $P_5$, and $P_6$ are inliers and $P_3$ and $P_4$ are outliers.

Each candidate-associated feature point pair generated in the feature quantity comparison section 12 maintains the estimated rotation angle information on the model's object image. As shown in FIG. 11B, the inliers' estimated rotation angles indicate similar values such as 40 degrees. On the other hand, the outliers' estimated rotation angles indicate different values such as 110 and 260 degrees. When an estimated rotation angle histogram is created as shown in FIG. 11C, its peak is provided by the estimated rotation angles assigned to the pairs that are inliers (or a very small number of outliers having the estimated rotation angles corresponding to the inliers).

The candidate-associated feature point pair selection section 14 then selects pairs having the estimated rotation angles to provide the peak in the estimated rotation angle histogram from the candidate-associated feature point pair group generated in the feature quantity comparison section 12. The candidate-associated feature point pair selection section 14 then supplies the selected pairs to the model attitude estimation section 13. In this manner, it is possible to stably and accurately estimate the affine transformation parameters for the model attitude. If the model is subject to remarkable stretch transform, however, points in the image show unstable rotation angles. Accordingly, this first technique is effective only when any remarkable stretch transform is not assumed.

The candidate-associated feature point pair selection section 14 uses the generalized Hough transform as a second technique to roughly estimate the model attitude. Specifically, the candidate-associated feature point pair selection section 14 performs the generalized Hough transform for the candidate-associated feature point pair group generated in the feature quantity comparison section 12 using a feature space (voting space) characterized by four image transform parameters such as rotation, enlargement and reduction ratios, and linear displacement (x and y directions). The most voted image transform parameter (most voted parameter) determines a roughly estimated model attitude on the model's object image. On the other hand, the candidate-associated feature point pair group that voted for the most voted parameter constitutes inliers (and a very small number of outliers) to support the roughly estimated model attitude.

The candidate-associated feature point pair selection section 14 supplies the model attitude estimation section 13 with the candidate-associated feature point pair group that voted for the most voted parameter. In this manner, it is possible to stably and accurately estimate the affine transformation parameters for the model attitude.

The candidate-associated feature point pair selection section 14 may use the above-mentioned first and second techniques together.

As mentioned above, the image recognition apparatus 1 according to the embodiment can detect a model from an object image that contains a plurality of objects partially overlapping with each other. Further, the image recognition apparatus 1 is robust against deformation of the image information due to viewpoint changes (image changes including linear displacement, enlargement and reduction, rotation, and stretch), brightness changes, and noise.

Figure 12:
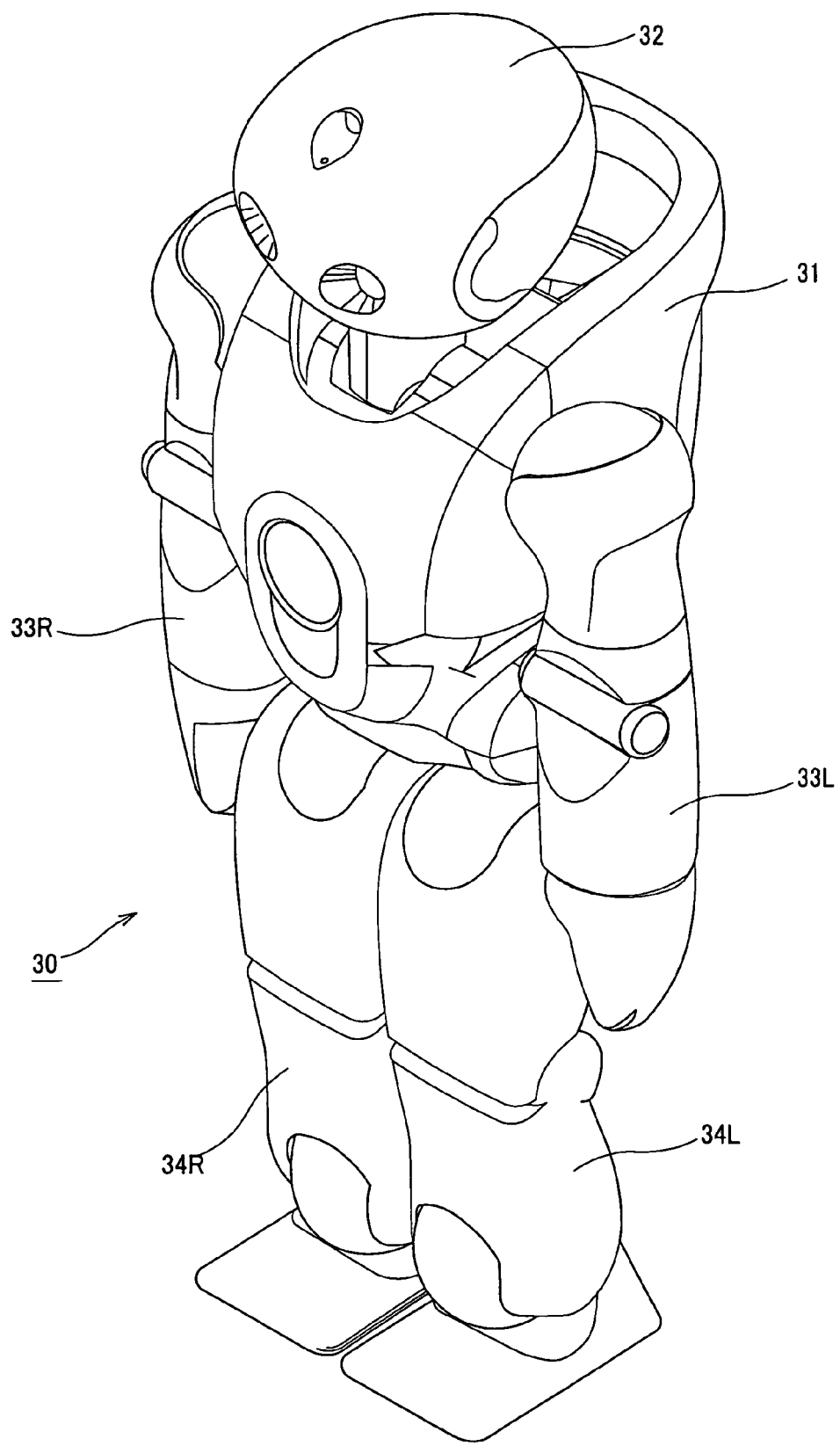
FIG. 12 is a perspective diagram showing the external configuration of a robot apparatus according to the embodiment.

The image recognition apparatus 1 can be mounted on a robot apparatus as shown in FIG. 12, for example. A bipedal walking robot apparatus 30 in FIG. 12 is a practical robot that assists in human activities for living conditions and the other various situations in daily life. The robot apparatus 30 is also an entertainment robot that can behave in accordance with internal states (anger, sadness, joy, pleasure, and the like) and represent basic human motions.

As shown in FIG. 12, the robot apparatus 30 comprises a head unit 32, right and left arm units 33R/L, and right and left leg units 34R/L coupled to specified positions of a torso unit 31. In these reference symbols, letters R and L are suffixes to indicate right and left, respectively. The same applies to the description below.

Figure 13:
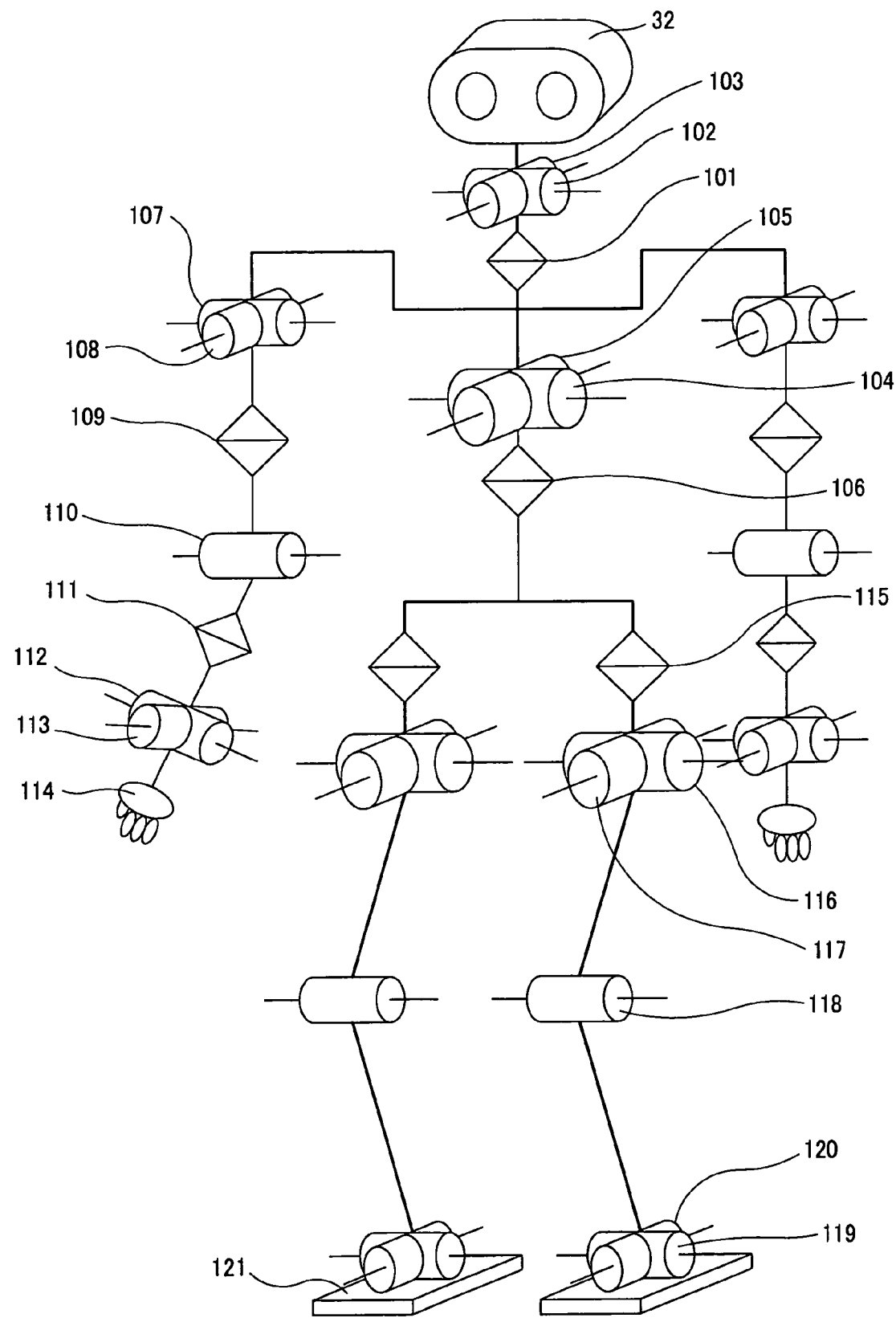
FIG. 13 schematically shows a degree-of-freedom configuration model for the robot apparatus.

FIG. 13 schematically shows a configuration of joint freedom degrees provided for the robot apparatus 30. A neck joint supporting the head unit 102 has three freedom degrees: a neck joint yaw axis 101, a neck joint pitch axis 102, and a neck joint roll axis 103.

Each of the arm units 33R/L constituting upper limbs comprises: a shoulder joint pitch axis 107; a shoulder joint roll axis 108; an upper arm yaw axis 109; an elbow joint pitch axis 110; a lower arm yaw axis 111; a wrist joint pitch axis 112; a wrist joint roll axis 113; and a hand section 114. The hand section 114 is actually a multi-joint, multi-freedom-degree structure including a plurality of fingers. However, operations of the hand section 114 have little influence on attitudes and walking control of the robot apparatus 1. For simplicity, this specification assumes that the hand section 114 has zero freedom degrees. Accordingly, each arm unit has seven freedom degrees.

The torso unit 2 has three freedom degrees: a torso pitch axis 104, a torso roll axis 105, and a torso yaw axis 106.

Each of leg units 34R/L constituting lower limbs comprises: a hip joint yaw axis 115, a hip joint pitch axis 116, a hip joint roll axis 117, a knee joint pitch axis 118, an ankle joint pitch axis 119, an ankle joint roll axis 120, and a foot section 121. This specification defines an intersecting point between the hip joint pitch axis 116 and the hip joint roll axis 117 to be a hip joint position of the robot apparatus 30. A human equivalent for the foot section 121 is a structure including a multi-joint, multi-freedom-degree foot sole. For simplicity, the specification assumes that the foot sole of the robot apparatus 30 has zero freedom degrees. Accordingly, each leg unit has six freedom degrees.

To sum up, the robot apparatus 30 as a whole has 32 freedom degrees (3+7×2+3+6×2) in total. However, the entertainment-oriented robot apparatus 30 is not limited to having 32 freedom degrees. Obviously, it is possible to increase or decrease freedom degrees, i.e., the number of joints according to design or production conditions, requested specifications, and the like.

Actually, an actuator is used to realize each of the above-mentioned freedom degrees provided for the robot apparatus 30. It is preferable to use small and light-weight actuators chiefly in consideration for eliminating apparently unnecessary bulges to approximate a natural human shape and providing attitude control for an unstable bipedal walking structure. It is more preferable to use a small AC servo actuator directly connected to a gear with a single-chip servo control system installed in a motor unit.

Figure 14:
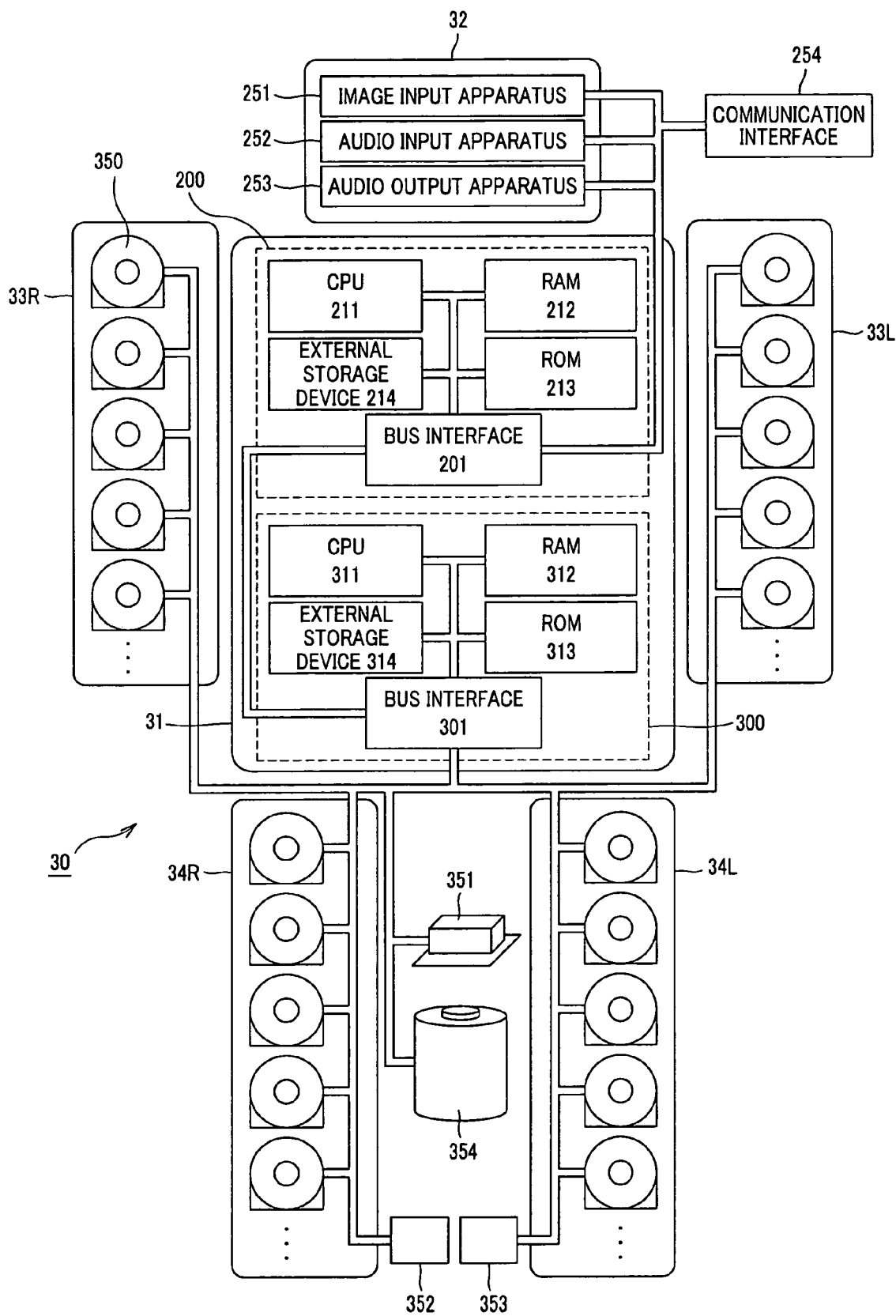
FIG. 14 shows a system configuration of the robot apparatus.

FIG. 14 schematically shows a control system configuration of the robot apparatus 30. As shown in FIG. 14, the control system comprises a reasoning control module 200 and a kinetic control module 300. The reasoning control module 200 controls affectional discrimination and emotional expressions in dynamic response to user inputs and the like. The kinetic control module 300 controls the entire body's coordinated movement of the robot apparatus 1 such as driving of an actuator 350.

The reasoning control module 200 comprises a CPU (Central Processing Unit) 211 to perform computing processes concerning affectional discrimination and emotional expressions, a RAM (Random Access Memory) 212, a ROM (Read Only Memory) 213, an external storage device (hard disk drive and the like) 214. The reasoning control module 200 is an independently driven information processing unit capable of self-complete processes within the module.

The reasoning control module 200 is supplied with image data from an image input apparatus 251, audio data from an audio input apparatus 252, and the like. In accordance with these stimuli from the outside, the reasoning control module 200 determines the current emotion or intention of the robot apparatus 30. The image input apparatus 251 has a plurality of CCD (Charge Coupled Device) cameras, for example. The audio input apparatus 252 has a plurality of microphones, for example.

The reasoning control module 200 issues an instruction to the kinetic control module 300 so as to perform a motion or action sequence based on the decision making, i.e., movement of limbs.

The kinetic control module 300 comprises a CPU 311 to control entire body's coordinated movement of the robot apparatus 30, a RAM 312, a ROM 313, an external storage device (hard disk drive and the like) 314. The kinetic control module 300 is an independently driven information processing unit capable of self-complete processes within the module. The external storage device 314 can store, for example, offline computed walking patterns, targeted ZMP trajectories, and the other action schedules. The ZMP is a floor surface point that causes zero moments due to a floor reaction force during walking. The ZMP trajectory signifies a trajectory along which the ZMP moves during a walking operation period of the robot apparatus 30. For the ZMP concept and application of ZMP to stability determination criteria of legged robots, refer to Miomir Vukobratovic, "LEGGED LOCOMOTION ROBOTS" (translated into Japanese as "Hokou Robotto To Zinkou No Ashi" by Ichiro Kato et al., The NIKKAN KOGYO SHIMBUN, LTD).

The kinetic control module 300 connects with: the actuator 350 to realize each of freedom degrees distributed to the whole body of the robot apparatus 30 shown in FIG. 13; an attitude sensor 351 to measure an attitude or inclination of the torso unit 2; landing confirmation sensors 352 and 353 to detect whether left and right foot soles leave from or touch the floor; and a power supply controller 354 to manage power supplies such as batteries. These devices are connected to the kinetic control module 300 via a bus interface (I/F) 301. The attitude sensor 351 comprises a combination of an acceleration sensor and a gyro sensor, for example. The landing confirmation sensors 352 and 353 comprise a proximity sensor, a micro switch, and the like.

The reasoning control module 200 and the kinetic control module 300 are constructed on a common platform. Both are interconnected via bus interfaces 201 and 301.

The kinetic control module 300 controls the entire body's coordinated movement by each of the actuators 350 to realize action instructed from the reasoning control module 200. In response to the action instructed by the reasoning control module 200, the CPU 311 retrieves a corresponding motion pattern from the external storage device 314. Alternatively, the CPU 311 internally generates a motion pattern. According to the specified motion pattern, the CPU 311 configures the foot section movement, ZMP trajectory, torso movement, upper limb movement, waist's horizontal position and height, and the like. The CPU 311 then transfers command values to the actuators 350. The command values specify motions corresponding to the configuration contents.

The CPU 311 uses an output signal from the attitude sensor 351 to detect an attitude or inclination of the torso unit 31 of the robot apparatus 30. In addition, the CPU 311 uses output signals from the landing confirmation sensors 352 and 353 to detect whether each of the leg units 5R/L is idling or standing. In this manner, the CPU 311 can adaptively control the entire body's coordinated movement of the robot apparatus 30.

Further, the CPU 311 controls attitudes or motions of the robot apparatus 30 so that the ZMP position is always oriented to the center of a ZMP stabilization area.

The kinetic control module 300 notifies the reasoning control module 200 of processing states, i.e., to what extent the kinetic control module 300 has fulfilled the action according to the decision made by the reasoning control module 200.

In this manner, the robot apparatus 30 can determine its and surrounding circumstances based on the control program and can behave autonomously.

In the robot apparatus 30, for example, the ROM 213 of the reasoning control module 200 stores a program (including data) to implement the above-mentioned image recognition function. In this case, the CPU 211 of the reasoning control module 200 executes an image recognition program.

Since the above-mentioned image recognition function is installed, the robot apparatus 30 can accurately extract the previously stored models from image data that is supplied via the image input apparatus 251. When the robot apparatus 30 walks autonomously, for example, there may be a case where an intended model needs to be detected from surrounding images captured by the CCD camera of the image input apparatus 251. In this case, the model is often partially hidden by other obstacles. The viewpoint and the brightness are changeable. Even in such case, the above-mentioned image recognition technique can accurately extract models.

The present invention is not limited to the above-mentioned embodiment with reference to the accompanying drawings. It is further understood by those skilled in the art that various modifications, replacements, and their equivalents may be made without departing from the spirit or scope of the appended claims.

INDUSTRIAL APPLICABILITY

The above-mentioned image recognition apparatus according to the present invention generates candidate-associated feature point pairs by paying attention only to the gradient direction, not accumulating gradient strengths for the histogram frequency. The robust feature quantity matching is available against brightness changes. Further, the apparatus can perform more stable matching in consideration for direction histogram shapes. In addition, it is possible to obtain the secondary stable feature quantity (estimated rotation angle).

The image recognition apparatus according to the present invention detects the presence or absence of models on an object image using candidate-associated feature point pairs that are generated based on the feature quantity similarity. When a model exists, the apparatus estimates the model's position and attitude. At this time, the apparatus does not use the least squares estimation to find affine transformation parameters that determine the model's position and attitude.

Instead, the apparatus finds affine transformation parameters based on the affine transformation parameters belonging to a cluster having the largest number of members on the parameter space where the affine transformation parameters are projected. Even if candidate-associated feature point pairs contain a false corresponding point pair, it is possible to stably estimate the model's position and attitude.

Accordingly, the robot apparatus, when mounted with such image recognition apparatus, can accurately extract the already stored models from input image data.

The invention claimed is:

1. An image recognition apparatus which compares an object image containing a plurality of objects with a model image containing a model to be detected and extracts the model from the object image, the apparatus comprising:
feature point extracting means for extracting a feature point from each of the object image and the model image;
feature quantity retention means for extracting and retaining, as a feature quantity, a density gradient direction histogram at least acquired from density gradient information in a neighboring region at the feature point in each of the object image and the model image, the density gradient direction histogram storing a number of points near the feature point having each of a plurality of gradient directions;
feature quantity comparison means for comparing the feature quantity of each feature point of the object image with the feature quantity of each feature point of the model image and generating a candidate-associated feature point pair having similar feature quantities; and
model attitude estimation means for detecting the presence or absence of the model on the object image using the candidate-associated feature point pair and estimating a position and an attitude of the model, if any,
wherein the feature quantity comparison means itinerantly shifts one of the density gradient direction histograms of feature points to be compared in density gradient direction to find distances between the density gradient direction histograms by sequentially shifting all of the feature points in the one of the density gradient direction histograms one by one to generate a plurality of shifted histograms, and generates the candidate-associated feature point pair by determining a shortest distance between (1) an other of the density gradient direction histograms and (2) the one of the density gradient direction histograms and the shifted histograms.

2. The image recognition apparatus according to claim 1, wherein the feature quantity retention means extracts and retains, as the feature quantity, an average density gradient vector for each of plurality of partial regions into which the neighboring region is further divided, and the feature quantity comparison means generates the candidate-associated feature point pair based on a distance between density gradient direction histograms for the feature points to be compared and on similarity between feature vectors which are collected in the neighboring region as average density gradient vectors in each of the partial regions.

3. The image recognition apparatus according to claim 2, wherein the feature quantity comparison means generates a provisional candidate-associated feature point pair based on a distance between the density gradient direction histograms for the feature points to be compared and, based on the similarity between feature vectors, selects the candidate-associated feature point pair from the provisional candidate-associated feature point pair.

4. The image recognition apparatus according to claim 3, wherein the feature quantity comparison means uses a rotation angle equivalent to a shift amount giving the shortest distance to correct a density gradient direction of a density gradient vector in the neighboring region and selects the candidate-associated feature point pair from the provisional candidate-associated feature point pair based on similarity between the feature vectors in a corrected neighboring region.

5. The image recognition apparatus according to claim 1, further comprising: candidate-associated feature point pair selection means for creating a rotation angle histogram concerning a rotation angle equivalent to a shift amount giving the shortest distance and selects a candidate-associated feature point pair giving a rotation angle for a peak in the rotation angle histogram from the candidate-associated feature point pair generated by the feature quantity comparison means, wherein the model attitude estimation means detects the presence or absence of the model on the object image using a candidate-associated feature point pair selected by the candidate-associated feature point pair selection means and estimates a position and an attitude of the model, if any.

6. An image recognition apparatus which compares an object image containing a plurality of objects with a model image containing a model to be detected and extracts the model from the object image, the apparatus comprising:
feature point extracting means for extracting a feature point from each of the object image and the model image;
feature quantity retention means for extracting and retaining, as a feature quantity, a density gradient direction histogram at least acquired from density gradient information in a neighboring region at the feature point in each of the object image and the model image, the density gradient direction histogram storing a number of points near the feature point having each of a plurality of gradient directions;
feature quantity comparison means for comparing the feature quantity of each feature point of the object image with the feature quantity of each feature point of the model image and generating a candidate-associated feature point pair having similar feature quantities; and
model attitude estimation means for detecting the presence or absence of the model on the object image using the candidate-associated feature point pair and estimating a position and an attitude of the model, if any,
wherein the feature quantity comparison means itinerantly shifts one of the density gradient direction histograms of feature points to be compared in density gradient direction to find distances between the density gradient direction histograms and generates the candidate-associated feature point pair by assuming a shortest distance to be a distance between the density gradient direction histograms, and
wherein the model attitude estimation means repeatedly projects an affine transformation parameter determined from three randomly selected candidate-associated feature point pairs onto a parameter space and finds an affine transformation parameter to determine a position and an attitude of the model based on an amine transformation parameter belonging to a cluster having the largest number of members out of clusters formed on a parameter space.

7. The image recognition apparatus according to claim 6, wherein the model attitude estimation means assumes a centroid for the cluster having the largest number of members to be an affine transformation parameter to determine a position and an attitude of the model.

8. The image recognition apparatus according to claim 6, wherein the model attitude estimation means assumes a candidate-associated feature point pair giving the affine transformation parameter belonging to a cluster having the largest number of members to be a true candidate-associated feature point pair and uses the true candidate-associated feature point pair for least squares estimation to find an affine transformation parameter for determining a position and an attitude of the model.

9. An image recognition apparatus which compares an object image containing a plurality of objects with a model image containing a model to be detected and extracts the model from the object image, the apparatus comprising:
feature point extracting means for extracting a feature point from each of the object image and the model image;
feature quantity retention means for extracting and retaining, as a feature quantity, a density gradient direction histogram at least acquired from density gradient information in a neighboring region at the feature point in each of the object image and the model image, the density gradient direction histogram storing a number of points near the feature point having each of a plurality of gradient directions;
feature quantity comparison means for comparing the feature quantity of each feature point of the object image with the feature quantity of each feature point of the model image and generating a candidate-associated feature point pair having similar feature quantities;
model attitude estimation means for detecting the presence or absence of the model on the object image using the candidate-associated feature point pair and estimating a position and an attitude of the model, if any; and
candidate-associated feature point pair selection means for performing generalized Hough transform for a candidate-associated feature point pair generated by the feature quantity comparison means, assuming a rotation angle, enlargement and reduction ratios, and horizontal and vertical linear displacements to be a parameter space, and selecting a candidate-associated feature point pair having voted for the most voted parameter from candidate-associated feature point pairs generated by the feature quantity comparison means, wherein the model attitude estimation means detects the presence or absence of the model on the object image using a candidate-associated feature point pair selected by the candidate-associated feature point pair selection means and estimates a position and an attitude of the model, if any,
wherein the feature quantity comparison means itinerantly shifts one of the density gradient direction histograms of feature points to be compared in density gradient direction to find distances between the density gradient direction histograms and generates the candidate-associated feature point pair by assuming a shortest distance to be a distance between the density gradient direction histograms.

10. An image recognition apparatus which compares an object image containing a plurality of objects with a model image containing a model to be detected and extracts the model from the object image, the apparatus comprising:
feature point extracting means for extracting a feature point from each of the object image and the model image;
feature quantity retention means for extracting and retaining, as a feature quantity, a density gradient direction histogram at least acquired from density gradient information in a neighboring region at the feature point in each of the object image and the model image, the density gradient direction histogram storing a number of points near the feature point having each of a plurality of gradient directions;
feature quantity comparison means for comparing the feature quantity of each feature point of the object image with the feature quantity of each feature point of the model image and generating a candidate-associated feature point pair having similar feature quantities; and
model attitude estimation means for detecting the presence or absence of the model on the object image using the candidate-associated feature point pair and estimating a position and an attitude of the model, if any,
wherein the feature quantity comparison means itinerantly shifts one of the density gradient direction histograms of feature points to be compared in density gradient direction to find distances between the density gradient direction histograms and generates the candidate-associated feature point pair by assuming a shortest distance to be a distance between the density gradient direction histograms, and
wherein the feature point extraction means extracts a local maximum point or a local minimum point in second-order differential filter output images with respective resolutions as the feature point, i.e., a point free from positional changes due to resolution changes within a specified range in a multi-resolution pyramid structure acquired by repeatedly applying smoothing filtering and reduction resampling to the object image or the model image.

11. An image recognition apparatus which compares an object image containing a plurality of objects with a model image containing a model to be detected and extracts the model from the object image, the apparatus comprising:
feature point extracting means for extracting a feature point from each of the object image and the model image;
feature quantity retention means for extracting and retaining a feature quantity in a neighboring region at the feature point in each of the object image and the model image, the feature quantity being a density gradient direction histogram storing a number of points near the feature point having each of a plurality of gradient directions;
feature quantity comparison means for comparing the feature quantity of each feature point of the object image with the feature quantity of each feature point of the model image and generating a candidate-associated feature point pair having similar feature quantities, each candidate-associated feature point pair including one feature point of the object image and one feature point of the model image; and
model attitude estimation means for detecting the presence or absence of the model on the object image using the candidate-associated feature point pair and estimating a position and an attitude of the model, if any,
wherein the model attitude estimation means repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space.

12. The image recognition apparatus according to claim 11, wherein the model attitude estimation means assumes a centroid for the cluster having the largest number of members to be an affine transformation parameter to determine a position and an attitude of the model.

13. The image recognition apparatus according to claim 11, wherein the model attitude estimation means assumes a candidate-associated feature point pair giving the affine transformation parameter belonging to a cluster having the largest number of members to be a true candidate-associated feature point pair and uses the true candidate-associated feature point pair for least squares estimation to find an affine transformation parameter for determining a position and an attitude of the model.

14. An image recognition apparatus which compares an object image containing a plurality of objects with a model image containing a model to be detected and extracts the model from the object image, the apparatus comprising:

feature point extracting means for extracting a feature point from each of the object image and the model image;

feature quantity retention means for extracting and retaining a feature quantity in a neighboring region at the feature point in each of the object image and the model image, the feature quantity being a density gradient direction histogram storing a number of points near the feature point having each of a plurality of gradient directions;

feature quantity comparison means for comparing the feature quantity of each feature point of the object image with the feature quantity of each feature point of the model image and generating a candidate-associated feature point pair having similar feature quantities;

model attitude estimation means for detecting the presence or absence of the model on the object image using the candidate-associated feature point pair and estimating a position and an attitude of the model, if any; and candidate-associated feature point pair selection means for performing generalized Hough transform for a candidate-associated feature point pair generated by the feature quantity comparison means, assuming a rotation angle, enlargement and reduction ratios, and horizontal and vertical linear displacements to be a parameter space, and selecting a candidate-associated feature point pair having voted for the most voted parameter from candidate-associated feature point pairs generated by the feature quantity comparison means, wherein the model attitude estimation means repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space, and wherein the model attitude estimation means detects the presence or absence of the model on the object image using a candidate-associated feature point pair selected by the candidate-associated feature point pair selection means and estimates a position and an attitude of the model, if any.

15. An image recognition apparatus which compares an object image containing a plurality of objects with a model image containing a model to be detected and extracts the model from the object image, the apparatus comprising:

feature point extracting means for extracting a feature point from each of the object image and the model image;

feature quantity retention means for extracting and retaining a feature quantity in a neighboring region at the feature point in each of the object image and the model image, the feature quantity being a density gradient direction histogram storing a number of points near the feature point having each of a plurality of gradient directions;

feature quantity comparison means for comparing the feature quantity of each feature point of the object image with the feature quantity of each feature point of the model image and generating a candidate-associated feature point pair having similar feature quantities;

model attitude estimation means for detecting the presence or absence of the model on the object image using the candidate-associated feature point pair and estimating a position and an attitude of the model, if any, wherein the model attitude estimation means repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space, and wherein the feature point extraction means extracts a local maximum point or a local minimum point in second-order differential filter output images with respective resolutions as the feature point, i.e., a point free from positional changes due to resolution changes within a specified range in a multi-resolution pyramid structure acquired by repeatedly applying smoothing filtering and reduction resampling to the object image or the model image.

16. An image recognition method which compares an object image containing a plurality of objects with a model image containing a model to be detected and extracts the model from the object image, the method comprising:

at least one processor performing the steps of, extracting a feature point from each of the object image and the model image;

extracting and retaining, as a feature quantity, a density gradient direction histogram at least acquired from density gradient information in a neighboring region at the feature point in each of the object image and the model image, the density gradient direction histogram storing a number of points near the feature point having each of a plurality of gradient directions;

comparing the feature quantity of each feature point of the object image with the feature quantity of each feature point of the model image and generating a candidate-associated feature point pair having similar feature quantities; and detecting the presence or absence of the model on the object image using the candidate-associated feature point pair and estimating a position and an attitude of the model, if any, wherein the comparing itinerantly shifts one of the density gradient direction histograms of feature points to be compared in density gradient direction to find distances between the density gradient direction histograms by sequentially shifting all of the feature points in the one of the density gradient direction histograms one by one to generate a plurality of shifted histograms, and generates the candidate-associated feature point pair by determining a shortest distance between (1) an other of the density gradient direction histograms and (2) the one of the density gradient direction histograms and the shifted histograms.

17. An image recognition method which compares an object image containing a plurality of objects with a model image containing a model to be detected and extracts the model from the object image, the method comprising:

at least one processor performing the steps of, extracting a feature point from each of the object image and the model image;

extracting and retaining a feature quantity in a neighboring region at the feature point in each of the object image and the model image, the feature quantity being a density gradient direction histogram storing a number of points near the feature point having each of a plurality of gradient directions;

comparing the feature quantity of each feature point of the object image with the feature quantity of each feature point of the model image and generating a candidate-associated feature point pair having similar feature quantities, each candidate-associated feature point pair including one feature point of the object image and one feature point of the model image; and detecting the presence or absence of the model on the object image using the candidate-associated feature point pair and estimating a position and an attitude of the model, if any, wherein the detecting repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space.

18. An autonomous robot apparatus capable of comparing an input image with a model image containing a model to be detected and extracting the model from the input image, the apparatus comprising:

image input means for imaging an outside environment to generate the input image;

feature point extracting means for extracting a feature point from each of the input image and the model image;

feature quantity retention means for extracting and retaining, as a feature quantity, a density gradient direction histogram at least acquired from density gradient information in a neighboring region at the feature point in each of the input image and the model image, the density gradient direction histogram storing a number of points near the feature point having each of a plurality of gradient directions;

feature quantity comparison means for comparing the feature quantity of each feature point of the input image with the feature quantity of each feature point of the model image and generating a candidate-associated feature point pair having similar feature quantities; and model attitude estimation means for detecting the presence or absence of the model on the input image using the candidate-associated feature point pair and estimating a position and an attitude of the model, if any, wherein the feature quantity comparison means itinerantly shifts one of the density gradient direction histograms of feature points to be compared in density gradient direction to find distances between the density gradient direction histograms by sequentially shifting all of the feature points in the one of the density gradient direction histograms one by one to generate a plurality of shifted histograms, and generates the candidate-associated feature point pair by determining a shortest distance between (1) an other of the density gradient direction histograms and (2) the one of the density gradient direction histograms and the shifted histograms.

19. An autonomous robot apparatus capable of comparing an input image with a model image containing a model to be detected and extracting the model from the input image, the apparatus comprising:

image input means for imaging an outside environment to generate the input image;

feature point extracting means for extracting a feature point from each of the input image and the model image;

feature quantity retention means for extracting and retaining a feature quantity in a neighboring region at the feature point in each of the input image and the model image, the feature quantity being a density gradient direction histogram storing a number of points near the feature point having each of a plurality of gradient directions;

feature quantity comparison means for comparing the feature quantity of each feature point of the input image with the feature quantity of each feature point of the model image and generating a candidate-associated feature point pair having similar feature quantities, each candidate-associated feature point pair including one feature point of the object image and one feature point of the model image; and a model attitude estimation means for detecting the presence or absence of the model on the input image using the candidate-associated feature point pair and estimating a position and an attitude of the model, if any, wherein the model attitude estimation means repeatedly projects an affine transformation parameter determined from three randomly selected candidate-associated feature point pairs onto a parameter space and finds an affine transformation parameter to determine a position and an attitude of the model based on an affine transformation parameter belonging to a cluster having the largest number of members out of clusters formed on a parameter space.

20. An image recognition apparatus which compares an object image containing a plurality of objects with a model image containing a model to be detected and extracts the model from the object image, the apparatus comprising:

a feature point extracting unit configured to extract a feature point from each of the object image and the model image;

a feature quantity retention unit configured to extract and retain, as a feature quantity, a density gradient direction histogram at least acquired from density gradient information in a neighboring region at the feature point in each of the object image and the model image, the density gradient direction histogram storing a number of points near the feature point having each of a plurality of gradient directions;

a feature quantity comparison unit configured to compare the feature quantity of each feature point of the object image with the feature quantity of each feature point of the model image and generating a candidate-associated feature point pair having similar feature quantities; and a model attitude estimation unit configured to detect the presence or absence of the model on the object image using the candidate-associated feature point pair and estimating a position and an attitude of the model, if any, wherein the feature quantity comparison unit itinerantly shifts one of the density gradient direction histograms of feature points to be compared in density gradient direction to find distances between the density gradient direction histograms by sequentially shifting all of the feature points in the one of the density gradient direction histograms one by one to generate a plurality of shifted histograms, and generates the candidate-associated feature point pair by determining a shortest distance between (1) an other of the density gradient direction histograms and (2) the one of the density gradient direction histograms and the shifted histograms.

21. An image recognition apparatus which compares an object image containing a plurality of objects with a model image containing a model to be detected and extracts the model from the object image, the apparatus comprising:

a feature point extracting unit configured to extract a feature point from each of the object image and the model image;

a feature quantity retention unit configured to extract and retain, as a feature quantity, a density gradient direction histogram at least acquired from density gradient information in a neighboring region at the feature point in each of the object image and the model image, the density gradient direction histogram storing a number of points near the feature point having each of a plurality of gradient directions;

a feature quantity comparison unit configured to compare the feature quantity of each feature point of the object image with the feature quantity of each feature point of the model image and to generate a candidate-associated feature point pair having similar feature quantities, each candidate-associated feature point pair including one feature point of the object image and one feature point of the model image, each feature quantity not including gradient magnitude information; and a model attitude estimation unit configured to detect the presence or absence of the model on the object image using the candidate-associated feature point pair and estimating a position and an attitude of the model, if any, wherein the model attitude estimation unit is configured to repeatedly project an affine transformation parameter determined from three randomly selected candidate-associated feature point pairs onto a parameter space and to find an affine transformation parameter to determine a position and an attitude of the model based on an affine transformation parameter belonging to a cluster having the largest number of members out of clusters formed on a parameter space.

22. The image recognition apparatus according to claim 21, wherein the feature quantity comparison unit is configured to generate each candidate-associated feature point pair to include one feature point of the object image and one feature point of the model image with a dissimilarity less than a threshold.

23. An image recognition apparatus which compares an object image containing a plurality of objects with a model image containing a model to be detected and extracts the model from the object image, the apparatus comprising:

a feature point extracting unit configured to extract a feature point from each of the object image and the model image;

a feature quantity retention unit configured to extract and retain, as a feature quantity, a density gradient direction histogram at least acquired from density gradient information in a neighboring region at the feature point in each of the object image and the model image, the density gradient direction histogram storing a number of points near the feature point having each of a plurality of gradient directions;

a feature quantity comparison unit configured to compare the feature quantity of each feature point of the object image with the feature quantity of each feature point of the model image and to generate a candidate-associated feature point pair having similar feature quantities, each feature quantity not including gradient magnitude information; and a model attitude estimation unit configured to detect the presence or absence of the model on the object image using the candidate-associated feature point pair and estimating a position and an attitude of the model, if any, wherein the model attitude estimation unit is configured to repeatedly project an affine transformation parameter determined from three randomly selected candidate-associated feature point pairs onto a parameter space and to find an affine transformation parameter to determine a position and an attitude of the model based on an affine transformation parameter belonging to a cluster having the largest number of members out of clusters formed on a parameter space, and wherein the feature quantity comparison unit is configured to generate the dissimilarity for each respective candidate-associated feature point pair by itinerantly shifting by one step the plurality of gradient directions for one of the object image and the model image to compute a number of similarities to a number of the plurality of gradient directions, and to take a minimum dissimilarity to be the dissimilarity.

* * * * *